United States Patent
Coaplen et al.

(10) Patent No.: US 12,504,055 B2
(45) Date of Patent: *Dec. 23, 2025

(54) TWIN TUBE SHOCK WITH ADJUSTABLE PRESSURE REGULATION

(71) Applicant: Fox Factory, Inc., Duluth, GA (US)

(72) Inventors: Joshua Coaplen, Asheville, NC (US); William O. Brown, IV, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,604

(22) Filed: Jan. 29, 2018

(65) Prior Publication Data

US 2018/0216692 A1    Aug. 2, 2018

Related U.S. Application Data

(60) Provisional application No. 62/452,264, filed on Jan. 30, 2017.

(51) Int. Cl.
*F16F 9/516* (2006.01)
*F16F 9/06* (2006.01)
(Continued)

(52) U.S. Cl.
CPC .............. *F16F 9/516* (2013.01); *F16F 9/062* (2013.01); *F16F 9/065* (2013.01); *F16F 9/325* (2013.01);
(Continued)

(58) Field of Classification Search
CPC .. F16F 9/516; F16F 9/466; F16F 9/348; F16F 9/3257; F16F 9/062; F16F 9/325; F16F 2230/186
See application file for complete search history.

(56) References Cited

U.S. PATENT DOCUMENTS 3,986,118 A   10/1976  Madigan
5,586,627 A   12/1996  Nezu et al.
(Continued)

FOREIGN PATENT DOCUMENTS

EP   1505315 A2   2/2005
EP   1659310 A2   5/2006
(Continued)

OTHER PUBLICATIONS

European Search Report, App No. 18154294, Jul. 4, 2018, 12 Pages.
(Continued)

*Primary Examiner* — David R Morris

(57) ABSTRACT

A fluid damper having a damper housing with a first and a second fluid volume, and a damping piston located within the damper and separating the first and second fluid volume. The damper piston has a piston fluid pathway formed therethrough and between the first and second fluid volume. The fluid damper includes a fluid accumulator having a pressurizable gas volume and an accumulator fluid volume isolated from one another by a separation member. The fluid damper has a first fluid pathway extending solely between the first fluid volume and the accumulator fluid volume, and the fluid damper has a second fluid pathway extending solely between the second fluid volume and the accumulator fluid volume. A flow control valve is located in at least one of the first and the second fluid pathways, and the flow control valve has a non-zero threshold value.

7 Claims, 16 Drawing Sheets

(51) Int. Cl.
  *F16F 9/32* (2006.01)
  *F16F 9/34* (2006.01)
  *F16F 9/348* (2006.01)
  *F16F 9/46* (2006.01)
(52) U.S. Cl.
  CPC .............. *F16F 9/3257* (2013.01); *F16F 9/34* (2013.01); *F16F 9/348* (2013.01); *F16F 9/46* (2013.01); *F16F 9/466* (2013.01); *F16F 2230/186* (2013.01)

(56) References Cited

U.S. PATENT DOCUMENTS

| | | | |
|---|---|---|---|
| 5,862,894 | A | 1/1999 | Boichot et al. |
| 5,952,823 | A | 9/1999 | Sprecher et al. |
| 6,073,536 | A | 6/2000 | Campbell |
| 7,950,506 | B2 | 5/2011 | Nowaczyk |
| 8,763,770 | B2 * | 7/2014 | Marking ................... F16F 9/42 188/274 |
| 9,228,630 | B2 | 1/2016 | Coaplen |
| 2006/0102440 | A1 | 5/2006 | Nygren et al. |
| 2006/0108190 | A1 | 5/2006 | Förster |
| 2009/0145706 | A1 | 6/2009 | Sintorn |
| 2014/0054122 | A1 | 2/2014 | Coaplen |
| 2015/0290991 | A1 * | 10/2015 | Cox ....................... B60G 13/06 188/269 |
| 2017/0072762 | A1 | 3/2017 | Kurita |
| 2017/0291466 | A1 | 10/2017 | Tong |
| 2019/0136932 | A1 | 5/2019 | Deferme |
| 2019/0154100 | A1 * | 5/2019 | Coaplen ................. F16F 9/464 |

FOREIGN PATENT DOCUMENTS

| | | |
|---|---|---|
| EP | 2126403 A1 | 12/2009 |
| EP | 2410203 A2 | 1/2012 |
| WO | 2008079093 A1 | 7/2008 |

OTHER PUBLICATIONS

European Search Report, App No. 19154362, Jul. 3, 2019, 10 Pages.
Extended European Search Report for EP Application 21168671.2 dated Nov. 8, 2021, 9 Pages.

* cited by examiner

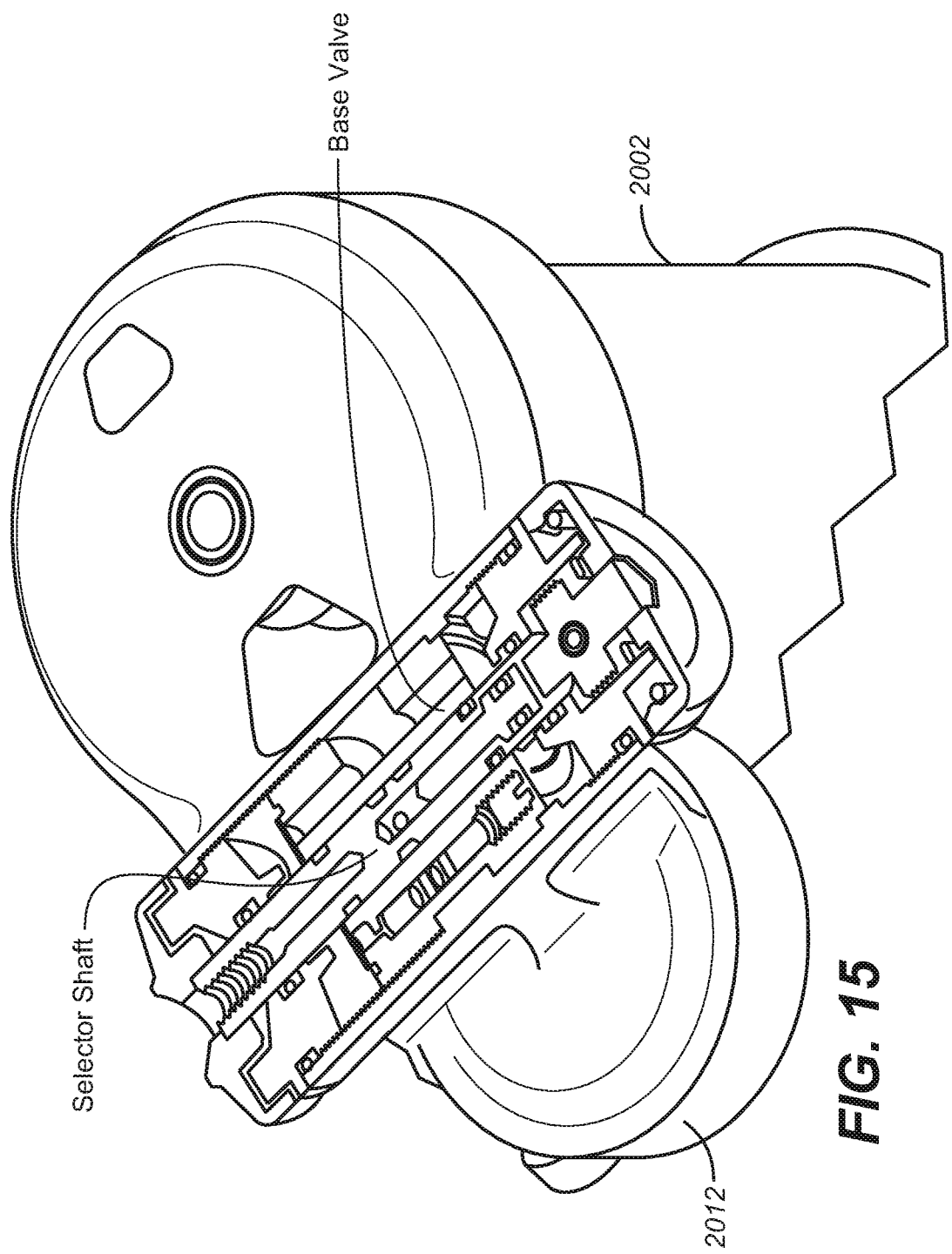

ABLE PRESSURE REGULATION" by Joshua Coaplen et al., which is incorporated herein, in its entirety, by reference.

TWIN TUBE SHOCK WITH ADJUSTABLE PRESSURE REGULATION

CROSS-REFERENCE TO RELATED APPLICATIONS

This application claims priority to and benefit of U.S. Provisional Patent Application No. 62/452,264, filed on Jan. 30, 2017, entitled "TWIN TUBE SHOCK WITH ADJUSTABLE PRESSURE REGULATION" by Joshua Coaplen et al., which is incorporated herein, in its entirety, by reference.

BACKGROUND OF THE INVENTION

Field of the Invention

The present disclosure relates to the field of dampening devices for vehicles, such as bicycles, motorcycles and three or greater wheeled vehicles. In a further aspect, the disclosure relates to fluid dampers having lower incidence of cavitation and predictable and user variable, compression and rebound characteristics.

Description of Related Art

Vehicle suspension systems typically include a spring component or components and a damping component or components. Typically, mechanical springs, such as metal leaf or helical springs, have been used in conjunction with some type of viscous fluid based damping mechanism mounted functionally in parallel. Dampers commonly include a housing forming a generally fixed volume chamber having a piston therein, which is attached to a suspension component by a rod or shaft attached thereto and extending from the chamber, and which piston moves axially within the chamber to dampen the impact of a suspension force event, such as a bump or obstruction in terrain over which the vehicle is moving. The damper typically operates by restricting the flow of working fluid across or through the piston as it traverses the chamber to slow the movement of a piston therein, especially during a compression stroke. The fluid flow restriction elements, because they are located on the piston which is sealed within the housing, are typically not user adjustable, and are also typically preset for "average" use conditions and thus are not adaptable to varying conditions.

One variant of the above described damper construct employs a gas reservoir which is coupled to the fluid of the damper across a floating piston. The gas reservoir provides a pressure reservoir source which is useful to cause the piston in the damper chamber to return to a steady state position after a compression event, also known as rebounding. During a compression event, the physical size of the fluid volume on the rebound side of the piston may rapidly increase, and if the fluid flow rate into the rebound chamber is not sufficiently fast, the pressure will drop in the fluid on the rebound side of the chamber to a level where any gas, such as air, entrained in the fluid will aspirate to reform a gas state thereof, causing cavitation in the fluid. This can cause serious disruption in the proper operation of the damper, and unacceptable noise emanating from the damper.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 15 is a cross-sectional view of a base valve including a selector shaft, in accordance with one embodiment of the present invention.

DESCRIPTION OF EMBODIMENTS

A dampening device, such as a strut or shock absorber, generally includes a tube shaped housing within which a piston, disposed on an end of a piston rod which extends outwardly of the housing, moves in response to forces imposed on the housing and the rod, the movement dampened by the presence of a fluid in the housing passing through valved openings in the piston, a secondary reservoir fluidly connected to the tube, and a connecting portion interconnecting the fluid portion f the tube and the secondary reservoir. Fluid is enabled to move between the housing and the secondary reservoir, in response to movement of the piston inwardly and outwardly of the housing. Fluid on one side of the piston is able to move through the piston, to the fluid volume on the opposite side of the piston, through one or more check valves within the body of the piston. The rate of fluid flow between the fluid volumes on either side of the piston, and between the fluid volumes in the dampening member housing and the secondary reservoir, affects the dampening effect of the dampening device upon the vehicle in which it is used. One example of a twin tube damper is found in commonly-owned, pending patent application filed on Apr. 13, 2015 having U.S. Ser. No. 14/685,348, and entitled "TWIN TUBE DAMPER WITH REMOTE GAS RESERVOIR" by Christopher Paul Cox, which is herein incorporated by reference in its entirety.

Figure 1:
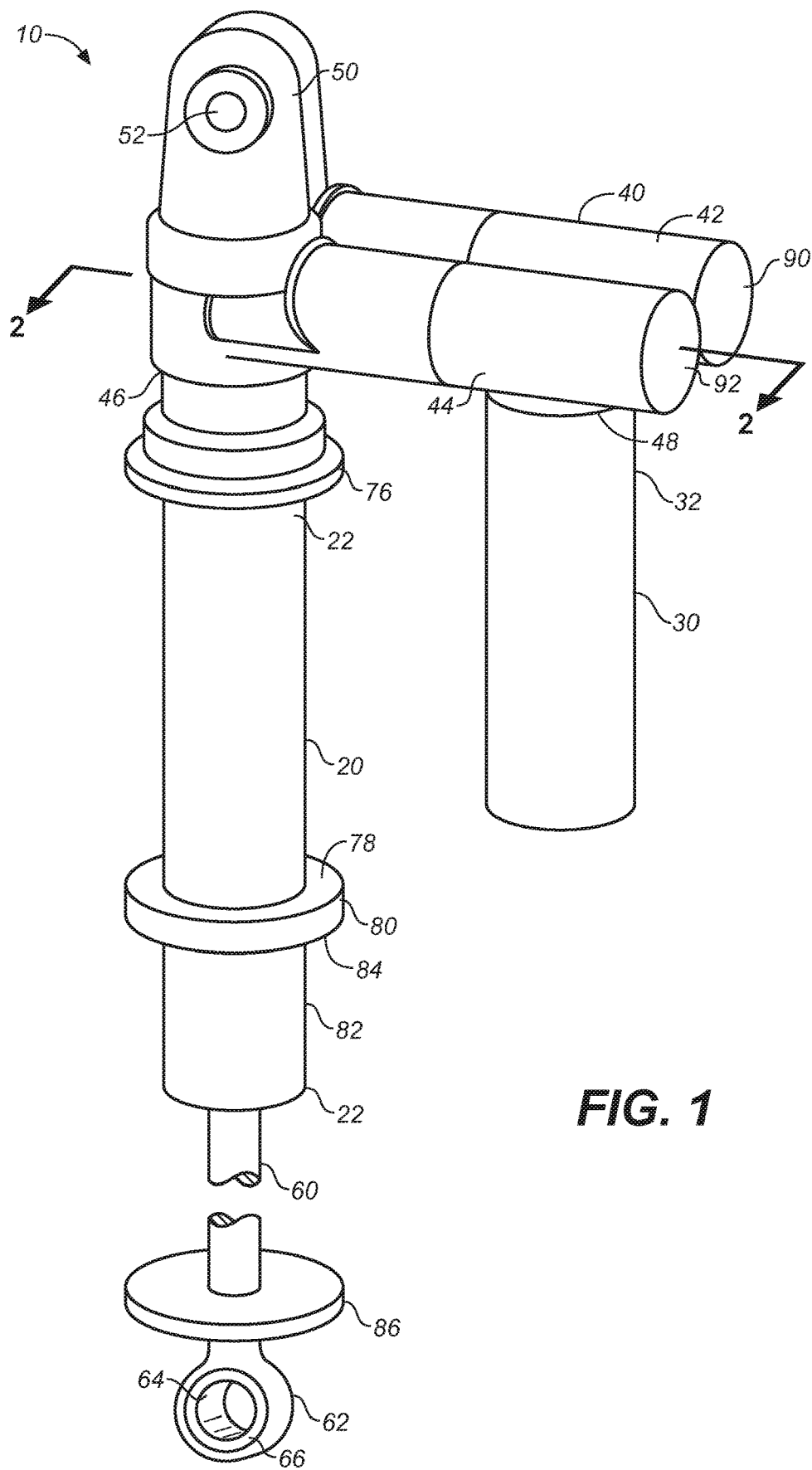
FIG. 1 is a schematic perspective view of an embodiment of the fluid damper hereof, in accordance with an embodiment.

Referring now to FIG. 1, a perspective view of the exterior structure of such a damping cylinder 20 and a remote reservoir 30 are fluidly interconnected through a valved interconnection housing 40 which also bounds one end of the internal pressurizable volumes of the damping cylinder 20 and of the remote reservoir 30. The valved interconnection housing also includes an attachment projection 50 through which a bushing 52 extends, for attaching the attachment projection 50, and thus one end of the damping cylinder 20, to a suspension or vehicle frame component. At the upper end 22 of the damping cylinder 20 opposite to the connection thereof to the valved interconnection housing 40, a piston rod 60 extends. The distal end 62 of the piston rod 60 surrounds a bushed opening 64, through which a bushing 66 extends. The distal end 62 of the piston rod 60 is thereby interconnected to the other of one of a vehicle frame or suspension components via the bushing 66.

The damper 10 is also configured to carry a secondary spring element, specifically a mechanical coil spring 70, for clarity of the later Figures shown only in FIG. 2, which provides additional rigidity and compression damping and rebounding force in the damper 10. In this embodiment, the mechanical coil spring 70 is bifurcated into an upper spring 72 and a lower spring 74. The upper spring 72 extends between, and bears against, an upper annular spring plate 76 secured to the outer surface of the body of the damping cylinder 20, and an upper surface 78 of an intermediate annular spring plate 80, which extends circumferentially outwardly around the circumference of a spring sleeve 82, which is configured and sized to fit over, but freely move in an axial direction over, the damping cylinder 20. The second, lower spring 74 extends from contact with the underside annular surface 84 of the intermediate annular spring plate 80, and into contact with a lower annular spring flange 86 extending outwardly from, and circumferentially around, the piston rod 60 adjacent to, but spaced in the damping cylinder 20 direction from, the distal end 62 thereof.

Referring again to FIG. 1, the valved interconnection housing 40 also includes two extensions or bosses 42, 44 which provide valved flow passages (not shown in this Figure) which extend from the damping cylinder 20 side to the remote reservoir 30 side of the valved interconnection housing 40, and, extending approximately normal to the extending direction of bosses 42, 44, an internally threaded boss 46, into which the upper end 22 of the damping cylinder 20 is secured and which is fluidly connected to the flow passages and a second boss 48, having a threaded projection 49 thereon (FIG. 2), over which the upper end 32 of the remote reservoir 30 body is secured and the interior of which is fluidly connected to the flow passage. Thus, as will be shown in greater detail in regard to FIG. 2 hereof, upon the movement of the piston rod 60 inwardly of the damping cylinder 20, fluid within the damping cylinder 20 may flow from the compression volume (also referred to as a compression chamber) in the interior of the damping cylinder 20, through a flow passage in the valved interconnection housing 40, and hence into the remote reservoir 30. Also, during a compression stroke, valves 90, 92 enable flow of fluid through the valved interconnection housing 40, and communication of fluid pressure, at the gas reservoir pressure, to the rebound side of the piston. Likewise, upon retraction of the piston rod 60 from the body of the damping cylinder 20, fluid may flow from adjacent the gas piston 36 in the remote reservoir 30, through a flow passage in the valved interconnection housing 40 and then into the compression volume of the damping cylinder 20, and fluid, and fluid may flow from the rebound side of the damping cylinder 20 to the remote reservoir 30, i.e., back through the valved interconnection housing 40. The selectable restriction to flow of fluid inwardly and outwardly of the remote reservoir 30 is provided by valves 90, 92, shown schematically on FIG. 1, which will be discussed in further detail herein.

Figure 2:
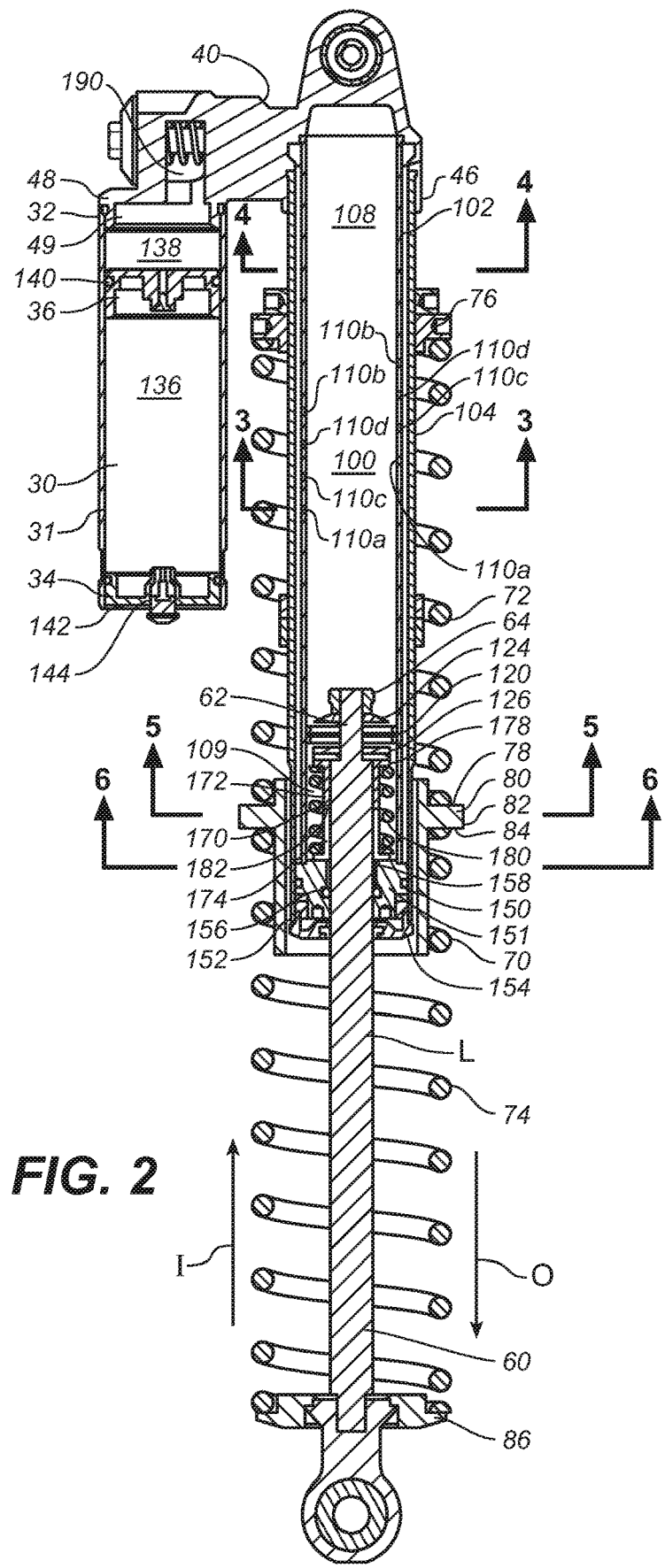
FIG. 2 is a sectional view of the fluid damper of FIG. 1, showing the details of the interior thereof, in accordance with an embodiment.
Figure 3:
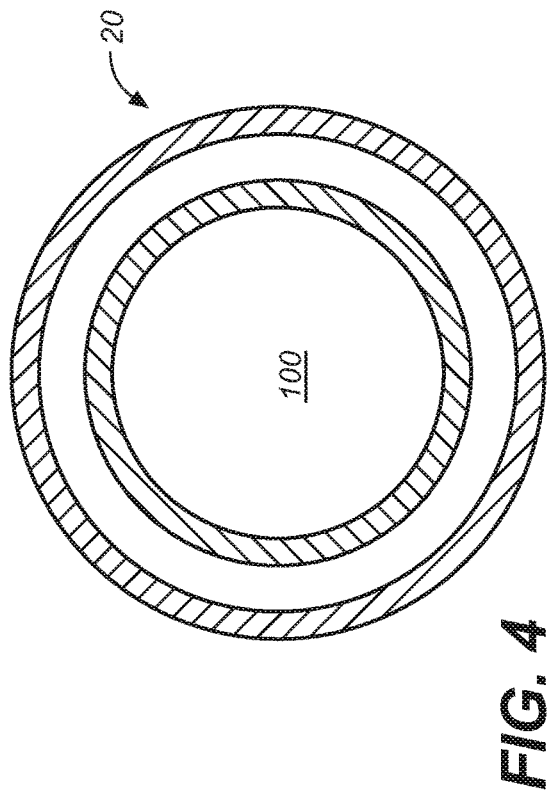
FIG. 3 is a sectional view of the fluid damper of FIG. 2 at section 3-3, in accordance with an embodiment.
Figure 4:
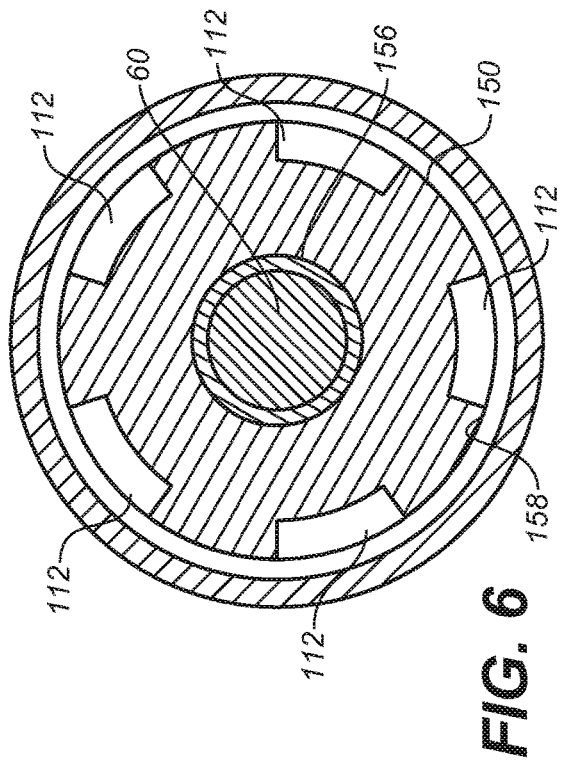
FIG. 4 is a sectional view of the fluid damper of FIG. 2 at section 4-4, in accordance with an embodiment.
Figure 5:
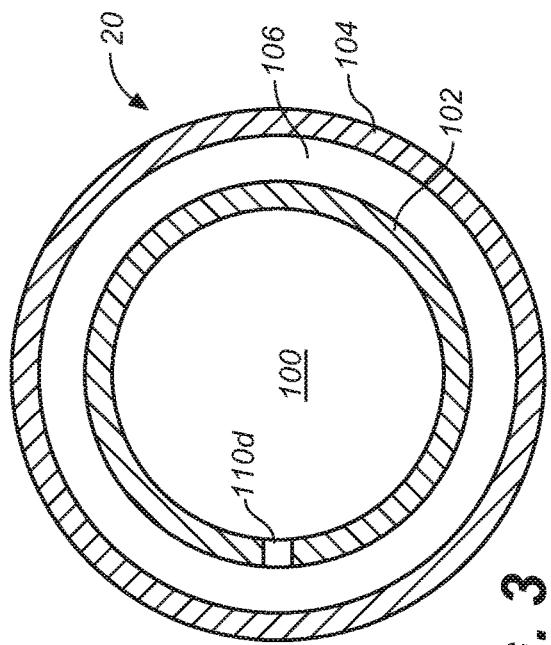
FIG. 5 is a sectional view of the fluid damper of FIG. 2 at section 5-5, in accordance with an embodiment.
Figure 6:
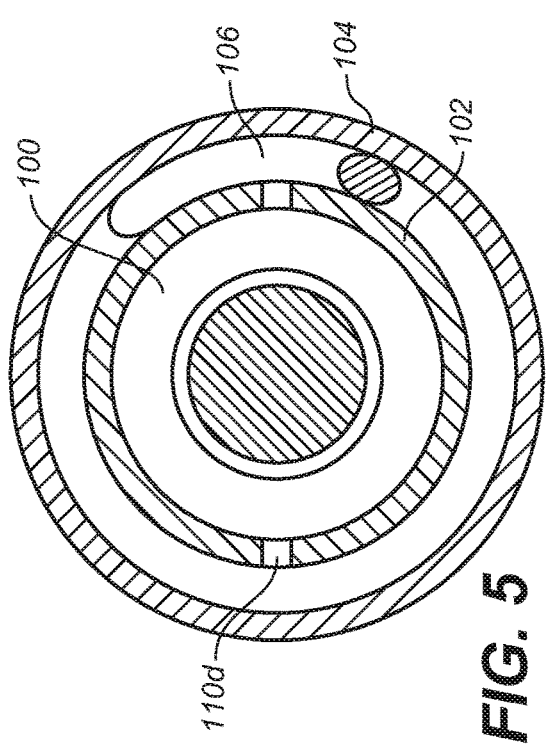
FIG. 6 is a sectional view of the fluid damper of FIG. 2 at section 6-6, in accordance with an embodiment.

Referring now to FIG. 2, details of the interrelationship of the damping cylinder 20 and the remote reservoir 30 are shown, wherein the damping cylinder 20, the remote reservoir 30, and the valved interconnection housing 40 are shown in cutaway across a portion of the valved interconnection housing 40 intermediate of the two valves 90, 92 thereon. As discussed previously herein, a mechanical coil spring 70, having an upper spring 72 and a lower spring 74, is disposed about the exterior of the damping cylinder 20. The damper 10 has a main volume 100, surrounded by an inner tube 102, and an annular volume 106 (FIGS. 3 and 5), formed between the inner tube 102 and an outer tube 104. The openings in the internally threaded boss 46 and second boss 48 of the interconnection housing 40 enable fluid communication by and between the inner tube 102 volume and the annular volume 106 of the damping cylinder 20 and the remote reservoir 30, as will be described in detail herein.

Referring now to FIGS. 2 to 6, the construction of the damping cylinder 20 is shown. It should be noted that the present invention is well suited to use with any of various types of twin tube dampers. Although numerous features are shown in FIG. 2 and discussed herein (e.g.: a mechanical coil spring member 70 having upper spring 72 and lower spring 74; internal bypass openings 110a-d; and the like), the present invention is also well suited to use with a twin tube damper which may or may not include such features. That is, the various embodiments of the present invention are not limited to use with a twin tube damper having all of the features depicted in the twin tube damper of FIG. 2.

Referring again to FIG. 2, the fluid volume within the inner tube 102 is bifurcated by the piston 120 into two variable volumes: a compression volume 108 (also referred to as a compression chamber) between the piston 120 and the opening of the damping cylinder 20 into the valved interconnection housing 40, and a rebound volume 109 (also referred to as a rebound chamber) which extends between the opposite side of the piston 120 to the inner face of seal housing 151. Additionally, to provide one of the fluid pathways for fluid communication between the compression volume 108 and the rebound volume 109, a plurality of openings 110a-d are provided through the wall of the inner tube 102 between the inner volume of the inner tube 102 and the annular volume 106, and a plurality of passages 112 (the plurality shown in FIG. 6) are provided at the interconnection location of inner tube 102 and the seal housing 151. Thus, during movement of the piston 120 within the inner tube 102, fluid may flow between the compression volume 108 and the rebound volume 109 portions of the inner tube 102 as the actual volume (size) of those volumes change as the piston 120 moves within the inner tube 102, from openings 110a-d through the annular volume 106 and into the rebound volume 109 through the passages 112, and, if the piston 120 is disposed intermediate of the openings 110a-d, for example, wherein opening 110a is on one side of the piston 120 and opening 110d is on another side of the piston 120, flow may occur therethrough between the rebound volume 109 and the compression volume 108. In one embodiment, these un-valved openings 110, and passages 112 thus provide a direct, though restricted by the cross section and of the openings, flow pathway for fluid between the compression volume 108 and the rebound volume 109 during piston 120 movement within the inner tube 102.

The openings 110 are configured as a plurality of larger openings 110a and 110b and smaller openings 110c and 110d and are provided in and through the wall of the inner tube 102 to communicate the main volume 100 (the compression volume 108 and the rebound volume 109) of the damper 10 with the annular volume 106 of the damper 10. In this embodiment, as shown in FIG. 2, a large upper and a large lower opening, 110a, 110b are disposed through the inner tube 102 along the sides of the inner tube 102 to either side of the inner tube 102, i.e., diametrically opposed across the circumference of the inner tube 102, and two smaller upper and lower openings 110c and 110d are located therebetween, i.e., between each pair of larger openings 110a and 110b. Additionally, the openings 110a-d on one side of the inner tube 102, e.g., to the right hand side of the inner tube 102 are offset, in the direction of the stroke of the piston 120 toward the valved interconnection housing 40, as compared to the location of the openings 110a-d to the left hand side of the inner tube 102, but the spacing between the adjacent openings 110a-d to either side of the inner tube 102 is the same. As a result, the openings are staggered along the longitudinal axis L of the inner tube 102. Thus, when a piston, such as piston 120 located within inner tube 102 traverses within the inner tube 102 in the direction of the valved interconnection housing 40, individual ones of the openings 110a-d will be encountered and selectively blocked by the piston 120, and as the piston 120 passes an opening, the number of openings 110a-d available to form a communication path from the annular volume 106 from the compression volume 108 on one side of the piston 120 to the rebound volume 109 on the other side of the piston 120, and vice-versa, will change.

Twin Tube Shock with Adjustable Pressure Regulation

Figure 7:
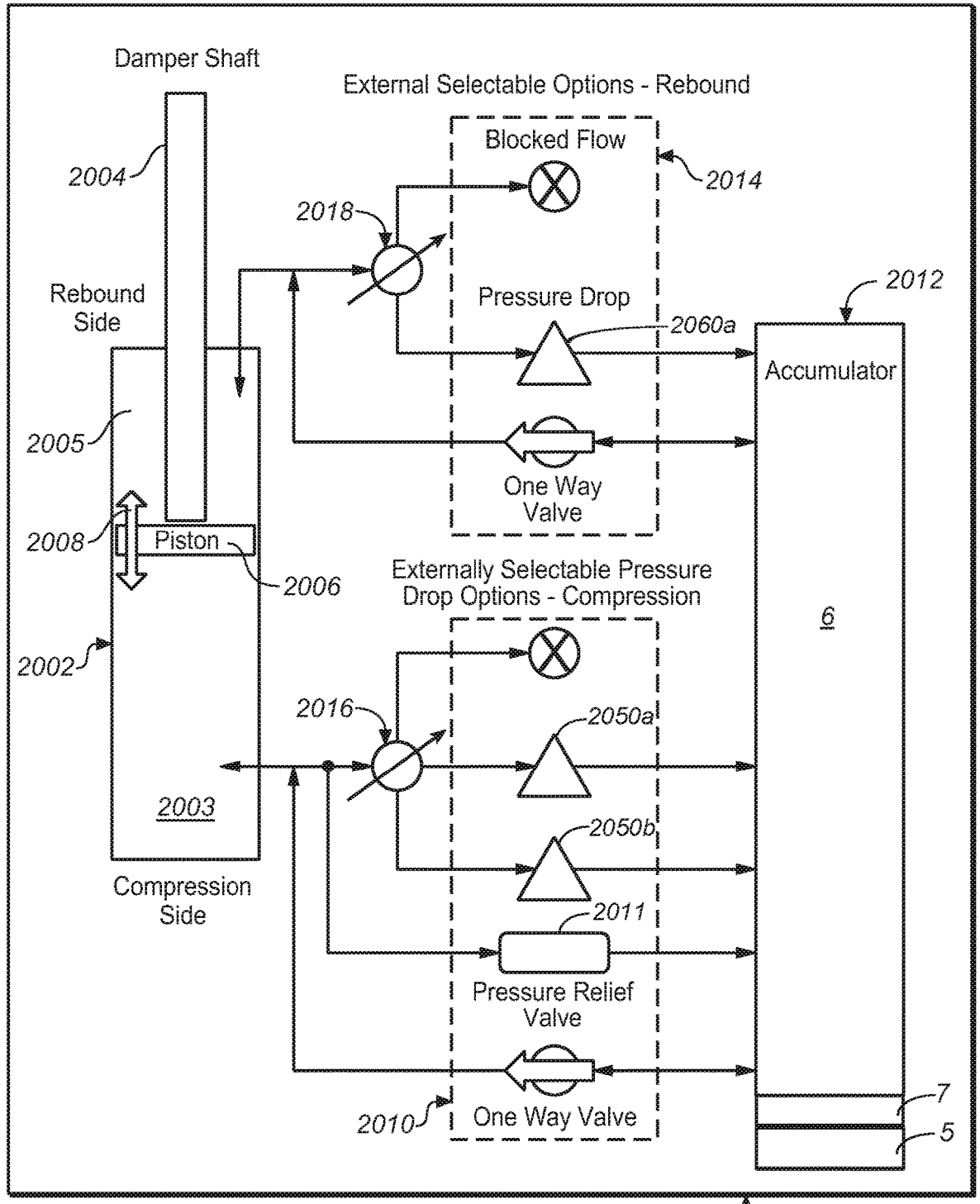
FIG. 7 is a schematic depiction of a twin tube shock in accordance with one embodiment of the present invention.
Figure 20:
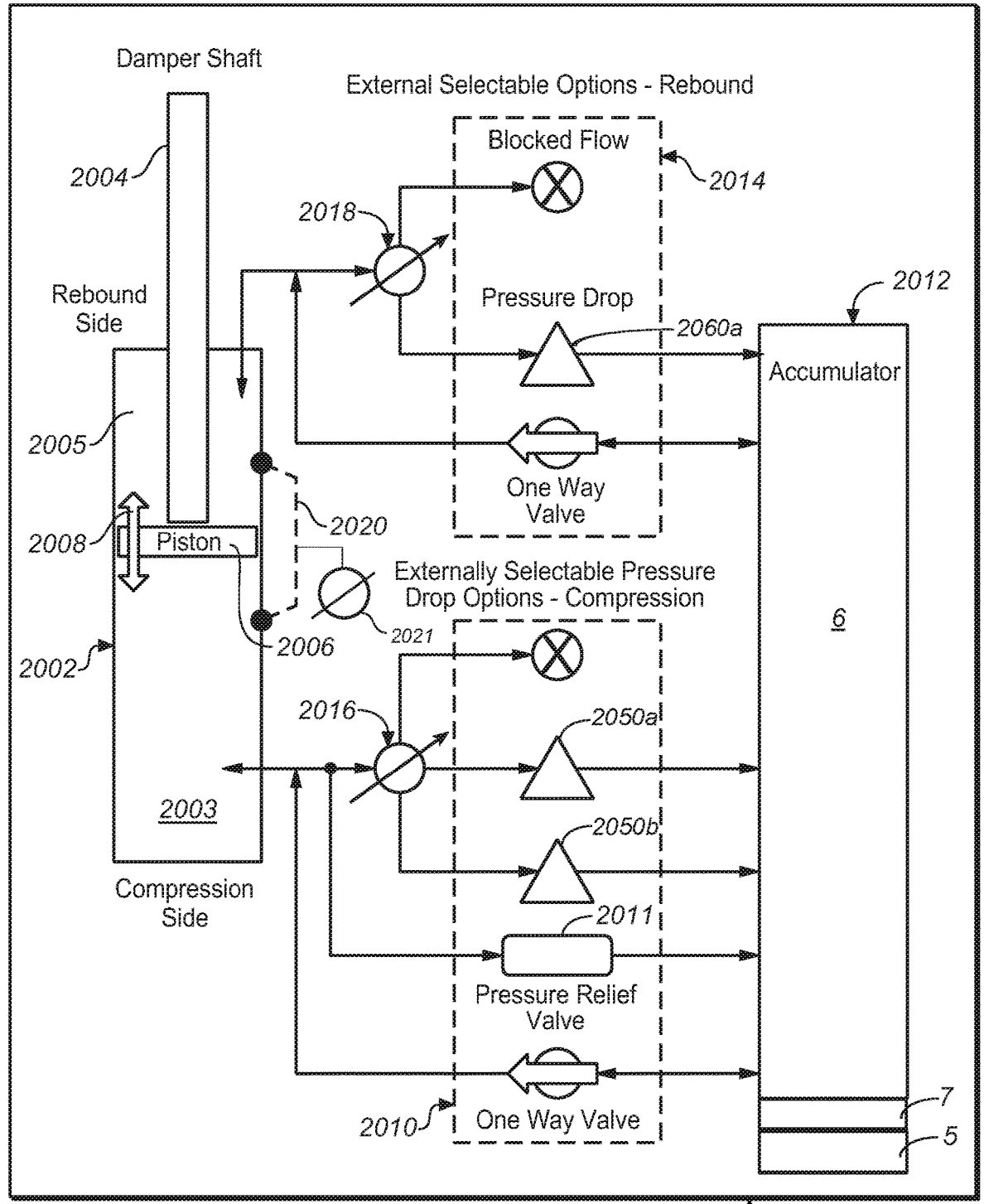
FIG. 20 is a schematic diagram of a twin tube shock including a controlled bypass fluid path extending between the compression side and the rebound side but which does not flow through the fluid accumulator, in accordance with one embodiment of the present invention.

In a twin tube style shock with externally adjustable damping, the threshold force/pressure at the maximum damping setting (sometimes referred to as a "hard mode") has traditionally been controlled by a compression valve(s) of the main damping piston. More specifically, the maximum damping setting is achieved through valving of the main damping piston, which strongly restricts the flow of fluid through the main damping piston. In one such approach, the compression valve is comprised of a tightly compressed (or stiff) shim stack, or other restrictive valving mechanism which is utilized to restrict and control the flow of fluid through the main damping piston. However, the "stiffness" of the valving of the main damping piston affects the damping curve for the twin tube shock at all settings, as the valving of the main damping piston is not traditionally externally adjustable. The consequence of this approach is that even when it is desired to place the twin tube shock in a minimum damping setting (sometimes referred to as a "soft mode"), the restrictive valving of the main damping piston prevents the twin tube shock from achieving an adequately soft setting. That is, the minimum damping that can be obtained for the twin tube shock is limited by the valving of the main damping piston. This situation is unique to twin tube style shocks as there is a fluid connection between the rebound-side of the main damping piston and a fluid accumulator. It will be understood to those of ordinary skill in the art, that a fluid accumulator, sometimes referred to as a reservoir, may typically be comprised, as depicted in FIG. 7 and FIG. 20, of a pressurizable gas volume 5 which is separated from an accumulator fluid volume 6 by some type of separation member 7. In some embodiments, the separation member 7 may be comprised of a floating piston.

Even in a state where there is little or no flow through a compression base valve (maximum possible base valve damping) fluid can still flow through the valving of the main damping piston, and then flow through the fluid connection between the rebound-side of the main damping piston and the fluid accumulator. Thus, in conventional twin tube shocks, the valving of the main damping piston dictates the stiffness of the hard mode, while also limiting the softness that can be achieved by the shock when in the soft mode.

In embodiments of the present invention, a twin tube shock is provided wherein the softness of a soft mode setting is not governed by the valving of the main damping piston. More specifically, in various embodiments of the present invention, the fluid connection between the rebound side of the main damping piston and the fluid accumulator is "switched off" in the hard mode (i.e. the maximum compression damping state). When this fluid connection is "switched off", the valving of the main damping piston no longer controls the maximum possible threshold force for the twin tube shock. Instead, in various embodiments of the present invention, the maximum possible threshold force for the twin tube shock is controlled by a selectable compression base valve. As a result, in an embodiment of the present invention, the valving of the main damping piston is selected such that is has a non-maximum compression damping setting. In such an embodiment, the valving of the main damping piston does not undesirably limit the softness of the soft mode for the twin tube shock. Hence, embodiments of the present invention provide a twin tube shock which can achieve a desired maximum damping setting (hard mode), and wherein the softness of a soft mode setting is not governed by valving of the main damping piston. It will be understood that many riders may judge the performance of a shock absorber based on the shock absorber's performance when in a soft setting. Such a soft setting may be employed, for example, when riding very quickly (e.g. downhill) and over bumpy terrain. Unlike, conventional twin tube shocks, embodiments of the present invention provide favorable soft mode operation, while still enabling a desired maximum damping setting when in hard mode.

Referring now to FIG. 7, a schematic depiction of a twin tube shock 2001 in accordance with one embodiment of the present invention is shown. In the embodiment of FIG. 7, twin tube shock 2001 is comprised of a twin tube style main damper body 2002 (also referred to as a housing). Additionally, the present embodiment further comprises a damper shaft 2004 and a main damping piston 2006 which is reciprocatingly disposed within the main damper body 2002. Main damping piston 2006 divides the volume within main damper body 2002 into a first fluid volume and a second fluid volume. As an example, main damping piston 2006 separates a first fluid volume, for example, compression side 2003 from a second fluid volume, for example, rebound side 2005. Damping piston valving 2008 of main damping piston 2006 is schematically depicted by an arrow. It will be understood that damping piston valving 2008 may comprise compression and/or rebound valving. In the present application, a fluid pathway which passes through main damping piston 2006 and, in some embodiments, damping piston valving 2008, is referred to as a piston fluid pathway. In various embodiments of the present invention, the piston fluid pathway will allow, under certain conditions, damping fluid to flow through main damping piston 2006 (and, in one embodiment, damping piston valving 2008) from the compression side 2003 to the rebound side 2005. In various embodiments of the present invention, the piston fluid pathway will allow, under certain conditions, damping fluid to flow through main damping piston 2006 (and, in one embodiment, damping piston valving 2008) from the rebound side 2005 to the compression side 2003. Also, in various embodiments of the present invention, the piston fluid pathway will allow, under certain conditions, damping fluid to flow through main damping piston 2006 (and, in one embodiment, damping piston valving 2008) from the compression side 2003 to the rebound side 2005, and the same piston fluid pathway (or a separate piston fluid pathway) will also allow, under certain conditions, damping fluid to flow from the rebound side 2005 to the compression side 2003.

In various embodiments of the present invention, damping piston 2008 has multiple piston fluid pathways formed therethrough. In such an embodiment, any one or more of the multiple piston fluid pathways may or may not have damping piston valving associated therewith. It will be understood to those of ordinary skill in the art that damping piston valving 2008 can be comprised of any of numerous types of valve components or various configurations of such valve components. It will further be understood to those of ordinary skill in the art, that when damping piston valving 2008 is present, damping piston valving 2008 will allow the flow of fluid therethrough once the fluid pressure exceeds a threshold value for damping piston valving 2008. It should further be noted that a specific threshold value for damping piston valving 2008 can be obtained through various techniques known to those of ordinary skill in the art.

Twin tube shock 2001 of the present embodiment further comprises a compression base valve 2010. As schematically depicted within the dotted box enclosing compression base valve 2010, compression base valve 2010 is comprised of various valve components which selectively fluidically couple compression side 2003 and fluid accumulator 2012. It will be understood to those of ordinary skill in the art that compression base valve 2010 can be comprised of any of numerous types of valve components or various configurations of such valve components. In embodiments of the present invention, compression base valve 2010 will allow the flow of fluid therethrough once the fluid pressure exceeds a threshold value for compression base valve 2010. In various embodiments of the present invention, compression base valve 2010 is configured to generate a particular threshold value. Hence, in such embodiments, compression base valve 2010 can be described as having a selectable threshold value. In various embodiments of the present invention, compression base valve 2010 is configured such that it has a non-zero threshold value.

Referring still to FIG. 7, in the present embodiment, compression base valve 2010 includes various selectable flow paths as indicated by 2050a and 2050b. Embodiments of the present invention are well suited to having a greater or lesser number of various selectable flow paths within compression base valve 2010. Additionally, in embodiments of the present invention, pressure relief valve 2011 may also be considered as a selectable flow path of compression base valve 2010. The embodiment of FIG. 7, as will be further described below, also includes an externally adjustable interface 2016 which controls the selection between at least two settings (e.g. between at least two of selectable flow paths 2050a and 2050b) for compression base valve 2010. It will be understood that a flow path, such as, for example, selectable flow path 2050a and/or selectable flow path 2050b refers to a particular fluidic path for damping fluid to flow through the components which comprise compression base valve 2010. In one embodiment, a first fluidic path (e.g. selectable flow path 2050*a*) will include a path through a first orifice of a component comprising compression base valve 2010 (see e.g., FIGS. 16-19C discussed below), while a second fluidic path (e.g. selectable flow path 2050*b*) will include a path through a second orifice of components comprising compression base valve 2010. In another embodiment, a first fluidic path (e.g. selectable flow path 2050*a*) will include a path through a first component comprising compression base valve 2010, while a second fluidic path (e.g. selectable flow path 2050*b*) will include a path through a second component comprising compression base valve 2010. That is, embodiments of the present invention, are well suited to various methods and structures for defining the various selectable flow paths. Additionally, in embodiments of the present invention, various selectable paths (e.g. selectable flow path 2060*a*) are also formed in a similar manner as described above for rebound base valve 2014.

In one embodiment, compression base valve 2010 includes a pressure relief valve 2011. In one such embodiment, pressure relief valve 2011 is disposed to fluidically couple compression side 2003 and fluid accumulator 2012 when the fluid pressure exceeds a pressure relief valve threshold value. Pressure relief valve 2011, in one embodiment, prevents hydrolock of twin tube shock 2001. For purposes of the present application, compression base valve 2010 may be generally referred to as a flow control valve.

As schematically depicted within the dotted box enclosing rebound base valve 2014, the present embodiment further comprises a rebound base valve 2014. Rebound base valve 2014 is comprised of various valve components which selectively fluidically couple rebound side 2005 and fluid accumulator 2012. It will be understood to those of ordinary skill in the art that rebound base valve 2014 can be comprised of any of numerous types of valve components or various configurations of such valve components. In the present embodiment, rebound base valve 2014 includes a selectable flow path as indicated by 2060*a*. Embodiments of the present invention are also well suited to having a greater or lesser number of various selectable flow paths within rebound base valve 2014. In embodiments of the present invention, rebound base valve 2014 will allow the flow of fluid therethrough once the fluid pressure exceeds a threshold value for rebound base valve 2014. In various embodiments of the present invention, rebound base valve 2014 is configured such that it has a non-zero threshold value. Also, for purposes of the present application, rebound base valve 2014 may also be generally referred to as a flow control valve. Rebound base valve 2014 may be also generally be referred to as an adjustable valve.

In various embodiments of the present invention, rebound base valve 2014 is configured to generate a particular threshold value. Hence, in such embodiments, rebound base valve 2014 can be described as having a selectable threshold value.

In another embodiment, rebound base valve 2014 includes a pressure relief valve, not shown. The pressure relief valve is used in lieu of, or in addition to, pressure relief valve 2011, and fluidically couples rebound side 2005 and fluid accumulator 2012 when the fluid pressure exceeds a pressure relief valve threshold value. The pressure relief valve, not shown, in one such embodiment, prevents hydrolock of twin tube shock 2001.

With reference still to FIG. 7, as stated above, various embodiments of the present twin tube shock 2001 include an externally adjustable interface 2016. Externally adjustable interface 2016 controls the selection between at least two settings (e.g. one of selectable flow paths 2050*a* and 2050*b*) for compression base valve 2010. Hence, in such an embodiment, compression base valve 2010 may be generally referred to as an adjustable valve. That is, externally adjustable interface 2016 controls the fluidic coupling between compression side 2003 and fluid accumulator 2012 by selectively determining the selectable flow path and thereby controlling the flow of fluid through the various components of the adjustable valve (compression base valve 2010). For purposes of the present application, the fluidic coupling between compression side 2003 and fluid accumulator 2012 may be described as occurring along a fluid pathway extending between the first fluid volume (compression side 2003) and the accumulator fluid volume.

In some embodiments of the present invention, unlike with conventional dampers, adjustments made to compression base valve 2010 via externally adjustable interface 2016, do not affect rebound base valve 2014. That is, the selection of a particular selectable flow path (e.g. one of selectable flow paths 2050*a* and 2050*b*) for compression base valve 2010, does not alter the flow path of rebound base valve 2014. Hence, in such an embodiment, compression base valve 2010 is independently adjustable and such an adjustment to compression base valve 2010 does not affect rebound base valve 2014.

In another embodiment of the present invention, externally adjustable interface 2016 also controls the selection between settings for rebound base valve 2014. That is, externally adjustable interface 2016 also controls the fluidic coupling between rebound side 2005 and fluid accumulator 2012 by selectively controlling the flow of fluid through the various components of the adjustable valve (rebound base valve 2014). That is, in such an embodiment, the selection of a particular selectable flow path (e.g. one of selectable flow paths 2050*a* and 2050*b*) for compression base valve 2010, also alters the flow path of rebound base valve 2014. Hence, in such an embodiment, compression base valve 2010 is not independently adjustable and such an adjustment to compression base valve 2010 also affects rebound base valve 2014. In such an embodiment, externally adjustable interface 2016 and externally adjustable interface 2018 may be coupled mechanically, hydraulically, pneumatically or through any other approach which will allow externally adjustable interface 2016 and externally adjustable interface 2018 to be operated together.

For purposes of the present application, the fluidic coupling between rebound side 2005 and fluid accumulator 2012 may be described as occurring along a fluid pathway extending between the second fluid volume (rebound side 2005) and the accumulator fluid volume.

In one embodiment of the present invention, as previously described herein, at least a second optional externally adjustable interface 2018 is used in combination with externally adjustable interface 2016 to control the fluidic coupling between fluid accumulator 2012 and one or both of compression side 2003 and rebound side 2005. In one such embodiment, externally adjustable interface 2016 controls fluidic coupling, via compression base valve 2010, between compression side 2003 and fluid accumulator 2012. Thus, externally adjustable interface 2016 ultimately adjusts compression base valve 2010 (e.g., the threshold value of compression base valve 2010, in one embodiment) and thereby controls the flow of fluid along the fluid pathway extending between the first fluid volume (compression side 2003) and the accumulator fluid volume. In one such embodiment, the adjustment of compression base valve 2010 does not affect rebound base valve 2014.

Similarly, in one embodiment, externally adjustable interface 2018 controls fluidic coupling, via rebound base valve 2014, between rebound side 2005 and fluid accumulator 2012. Thus, externally adjustable interface 2018 ultimately adjusts rebound base valve 2014 (e.g., the threshold value of rebound base valve 2014, in one embodiment) and thereby controls the flow of fluid along the fluid pathway extending between the second fluid volume (rebound side 2005) and the accumulator fluid volume. In one such embodiment, the adjustment of rebound base valve 2014 does not affect compression base valve 2010.

With reference still to FIG. 7, in one embodiment, when externally adjustable interface 2016 is set at a restrictive compression base valve setting (hard mode), externally adjustable interface 2016 also prevents fluid from flowing from the rebound side 2005 to fluid accumulator 2012 through rebound base valve 2014. As a result, in such an embodiment, compression base valve 2010 controls the maximum possible threshold force (hard mode) for twin tube shock 2001. That is, in various embodiments of the present invention, the maximum possible threshold force for twin tube shock 2001 is controlled by compression base valve 2010, as selectively controlled by externally adjustable interface 2016. Hence, in an embodiment of the present invention, damping piston valving 2008 of main damping piston 2006 is chosen such that is has a non-maximum compression damping setting. In such an embodiment, damping piston valving 2008 of main damping piston 2006 does not undesirably limit the softness of the soft mode for twin tube shock 2001.

Figure 8:
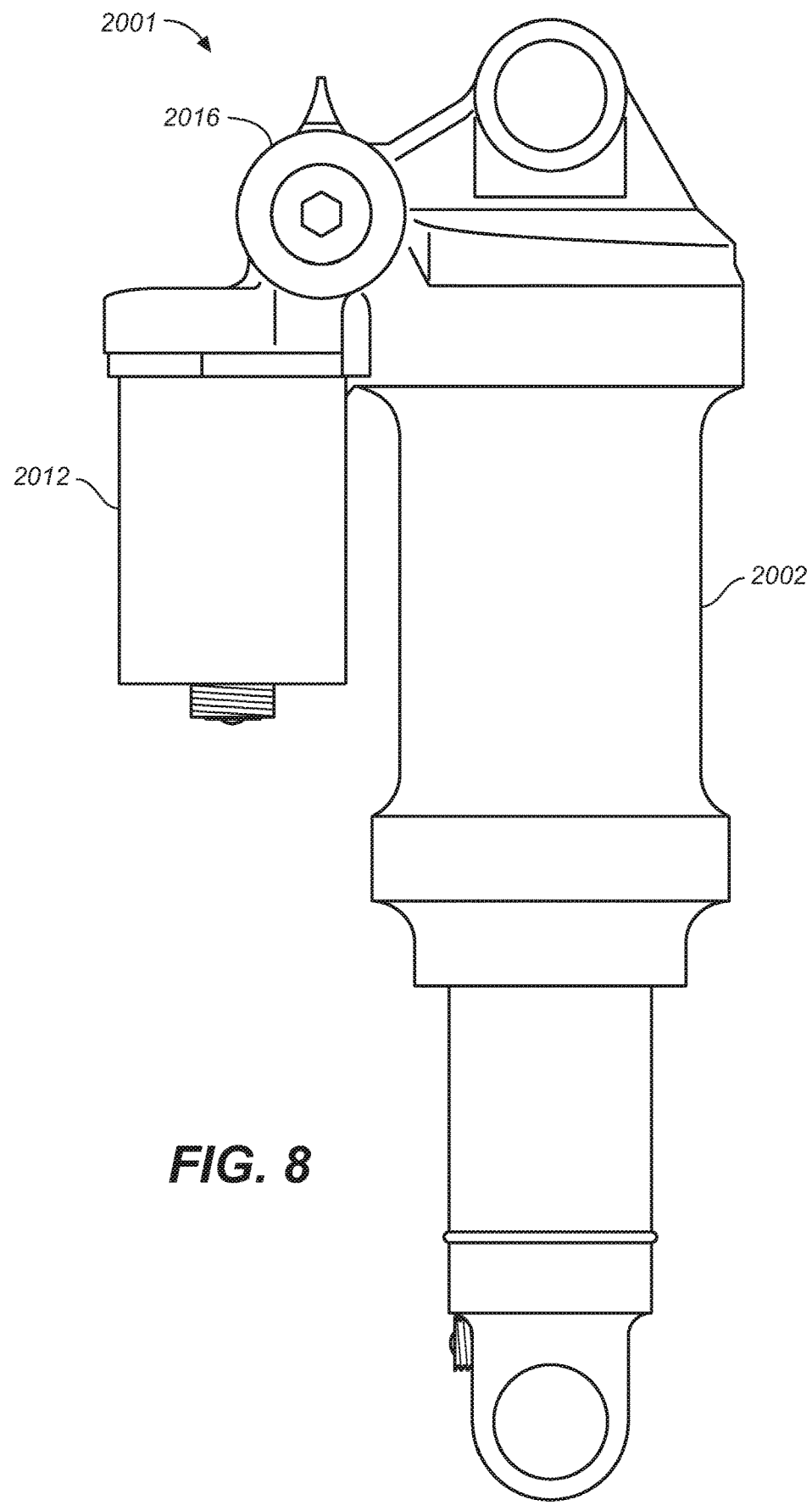
FIG. 8 a back perspective view of twin tube shock in accordance with one embodiment of the present invention.

Referring now to FIG. 8, a back perspective view of twin tube shock 2001 of FIG. 7 is shown. In FIG. 8, external surfaces corresponding to main damper body 2002 and fluid accumulator 2012 are shown. Additionally, in FIG. 8, the external surface of externally adjustable interface 2016 of FIG. 7 is shown.

Figure 9:
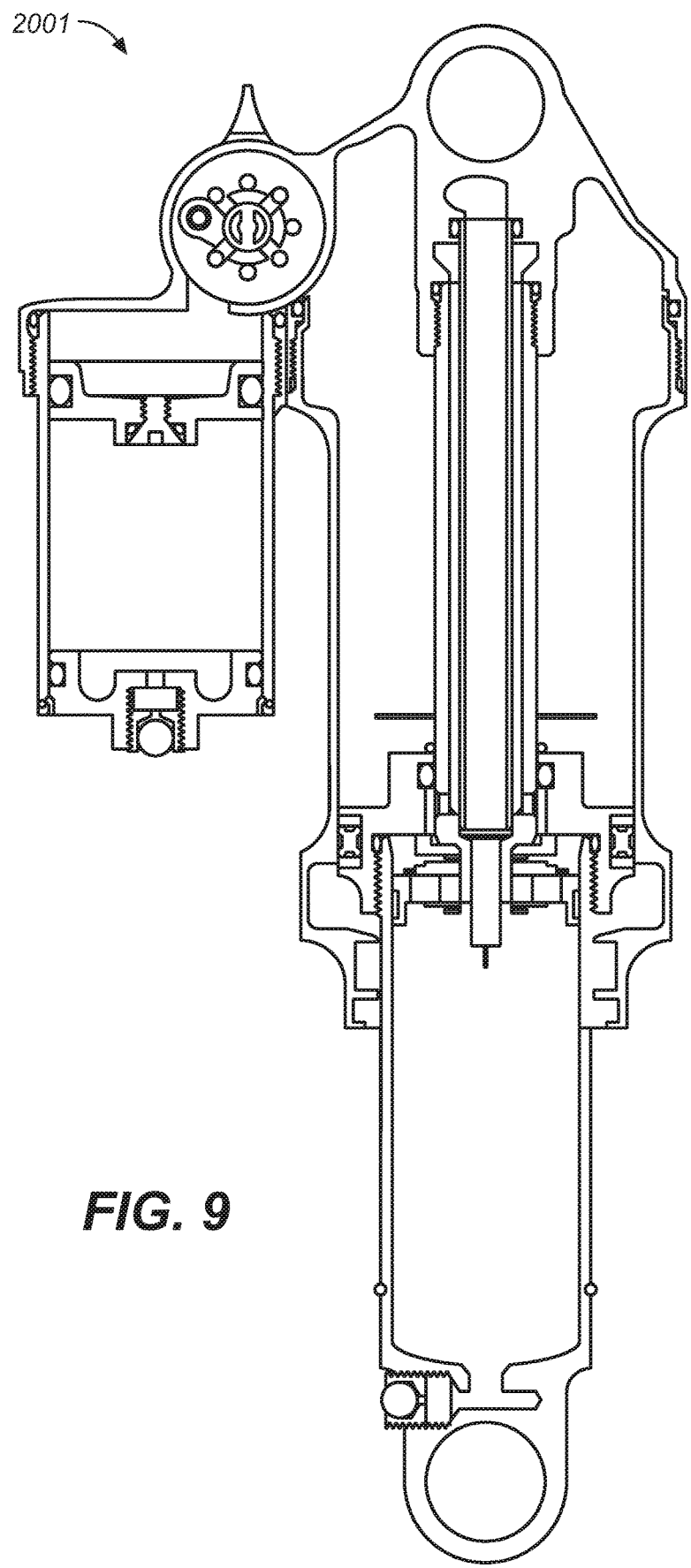
FIG. 9 is a cross-sectional view illustrating internal features of a twin tube shock in accordance with one embodiment of the present invention.

FIG. 9 is a cross-sectional view illustrating internal features of the present twin tube shock 2001.

Figure 10:
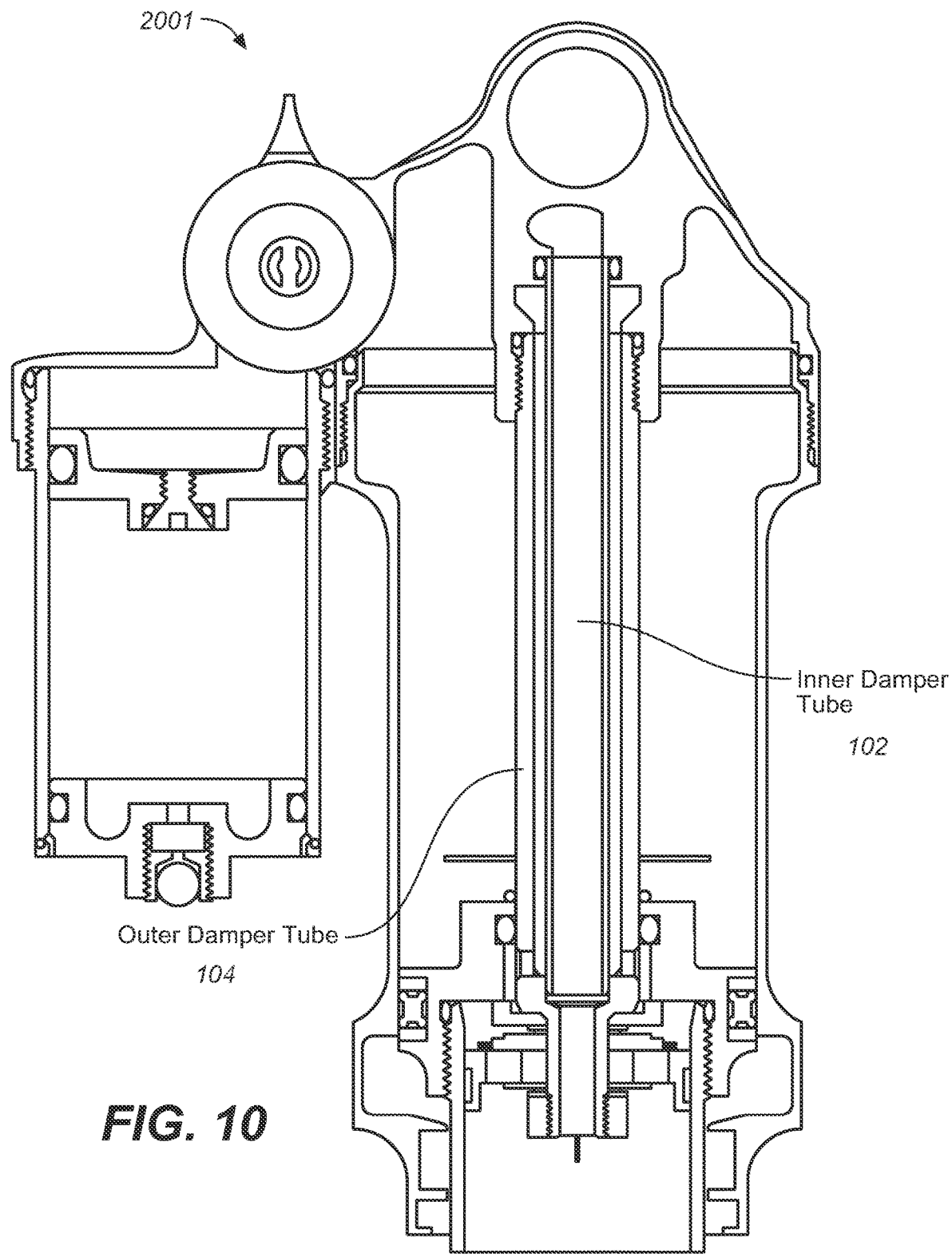
FIG. 10 is a close-up view, of a portion of the cross-sectional view of FIG. 9, illustrating internal features such as the outer tube damper and the inner tube damper in accordance with one embodiment of the present invention.

FIG. 10 is a zoomed cross-sectional view illustrating internal features such as the inner tube 102 damper and the outer tube 104 damper of one embodiment of the present twin tube shock 2001.

Figure 11B:
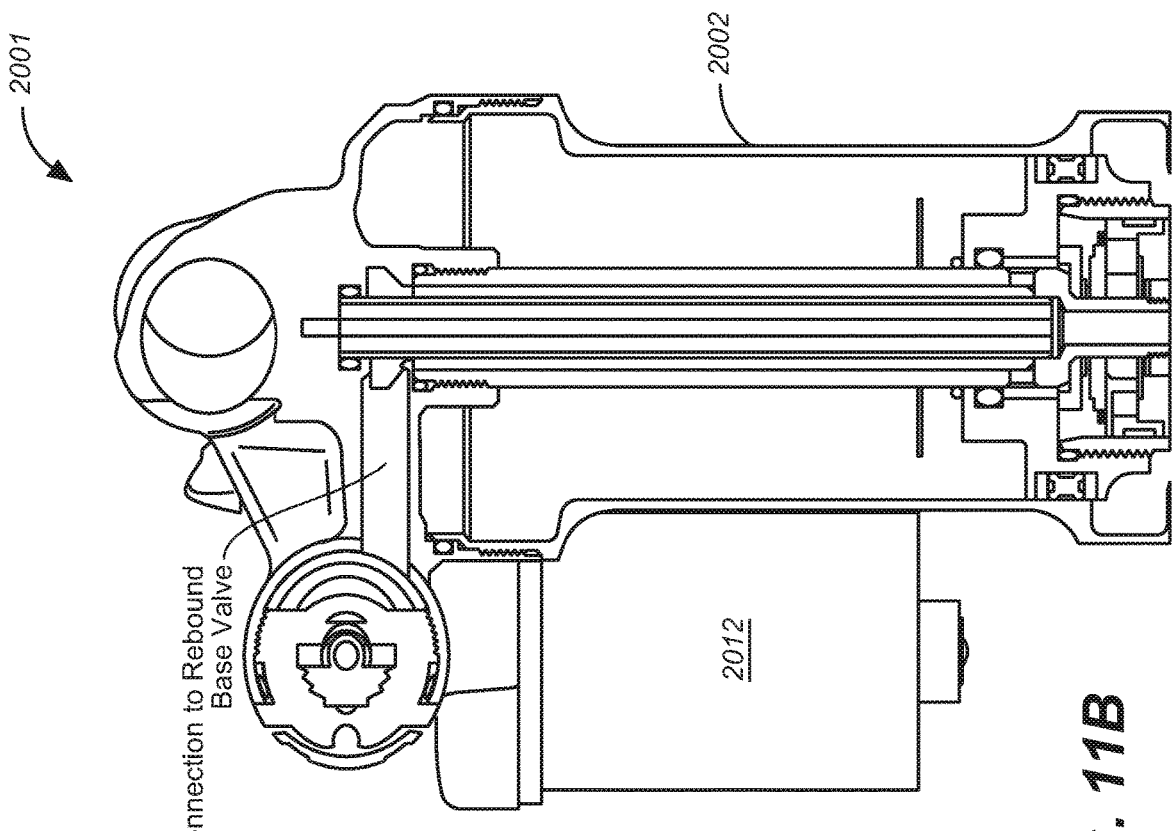
FIG. 11B is a cross-sectional view, taken through the section plane shown in FIG. 11A, showing a fluid connection path extending from the main damper body to the rebound base valve (schematically depicted as 2014 in FIG. 7), in accordance with one embodiment of the present invention.
Figure 11A:
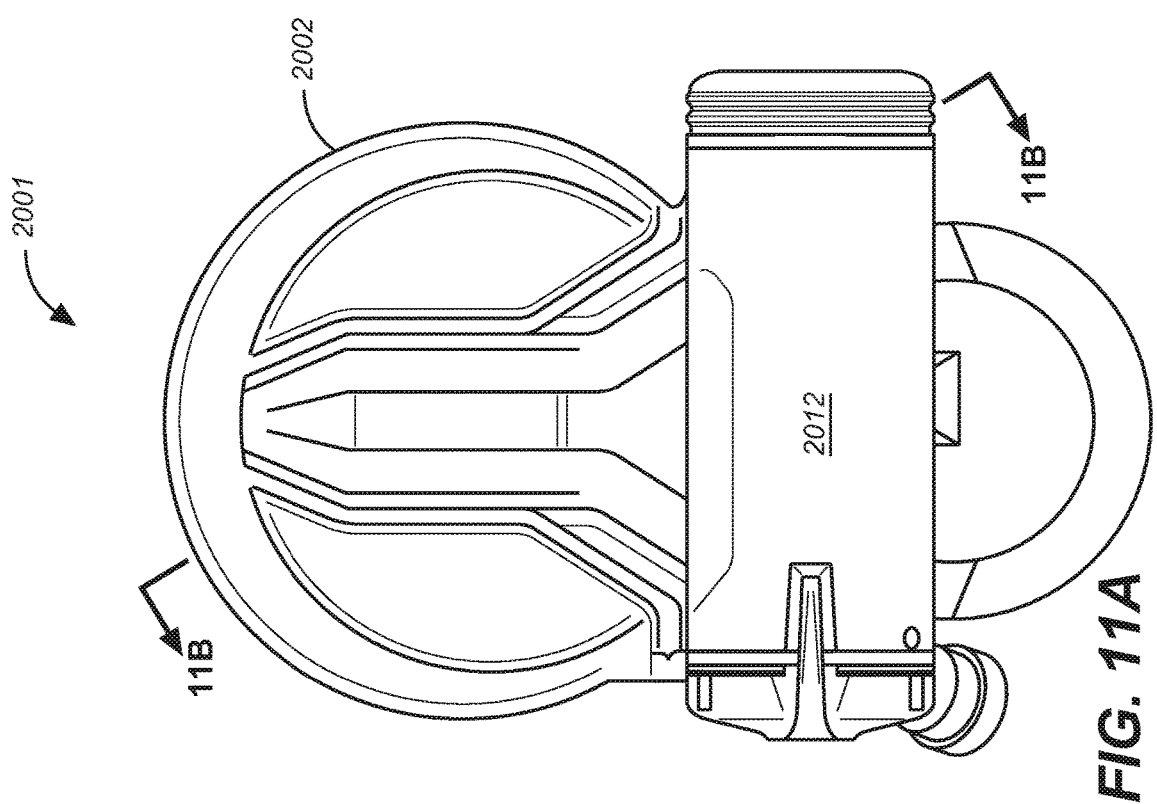
FIG. 11A is a top view of a twin tube shock, in accordance with one embodiment of the present invention, including a section plane corresponding to the cross-sectional view provided in FIG. 11B.

FIG. 11A is a top view of the present twin tube shock 2001 including a section plane corresponding to the cross-sectional view provided in FIG. 11B.

FIG. 11B is a cross-sectional view taken through the section plane shown in FIG. 11A. FIG. 11B shows a fluid connection path extending from the main damper body 2002 to the rebound base valve (schematically depicted as 2014 in FIG. 7).

Figure 12B:
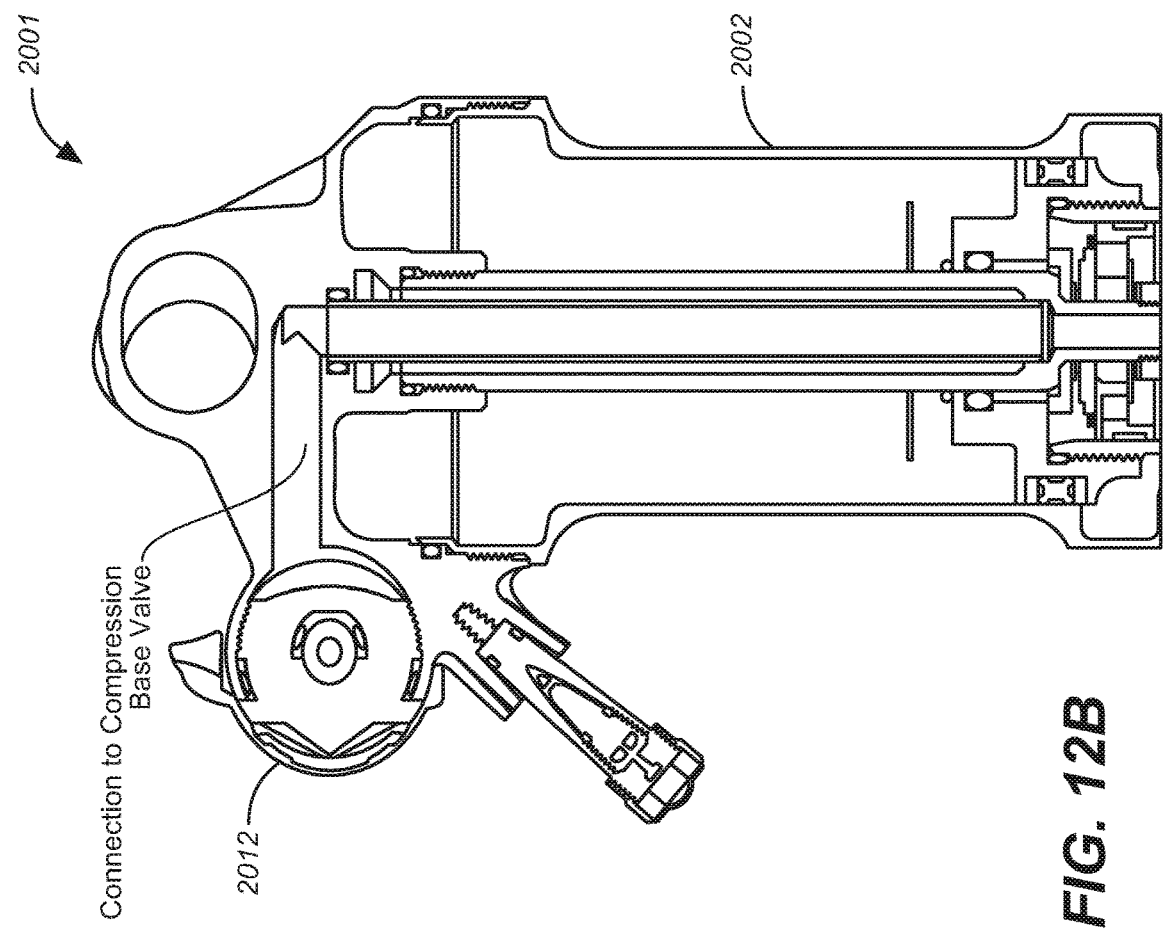
FIG. 12B is a cross-sectional view, taken through the section plane shown in FIG. 12A, showing a fluid connection path extending from the main damper body to the compression base valve (schematically depicted as 2010 in FIG. 7), in accordance with one embodiment of the present invention.
Figure 12A:
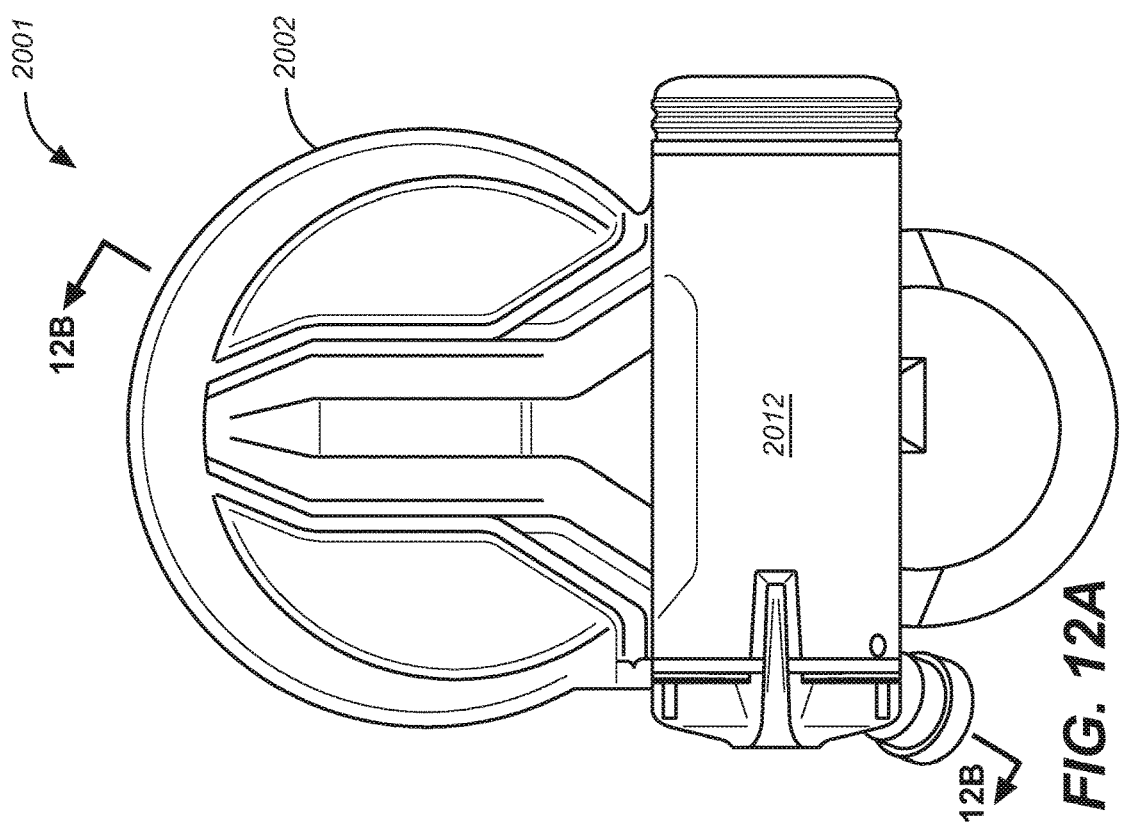
FIG. 12A is a top view of a twin tube shock, in accordance with one embodiment of the present invention, including a section plane corresponding to the cross-sectional view provided in FIG. 12B.

FIG. 12A is a top view of the present twin tube shock 2001 including a section plane corresponding to the cross-sectional view provided in FIG. 12B. FIG. 12B is a cross-sectional view taken through the section plane shown in FIG. 12A. FIG. 12B shows a fluid connection path extending from the main damper body 2002 to the compression base valve (schematically depicted as 2010 in FIG. 7).

Figure 13A:
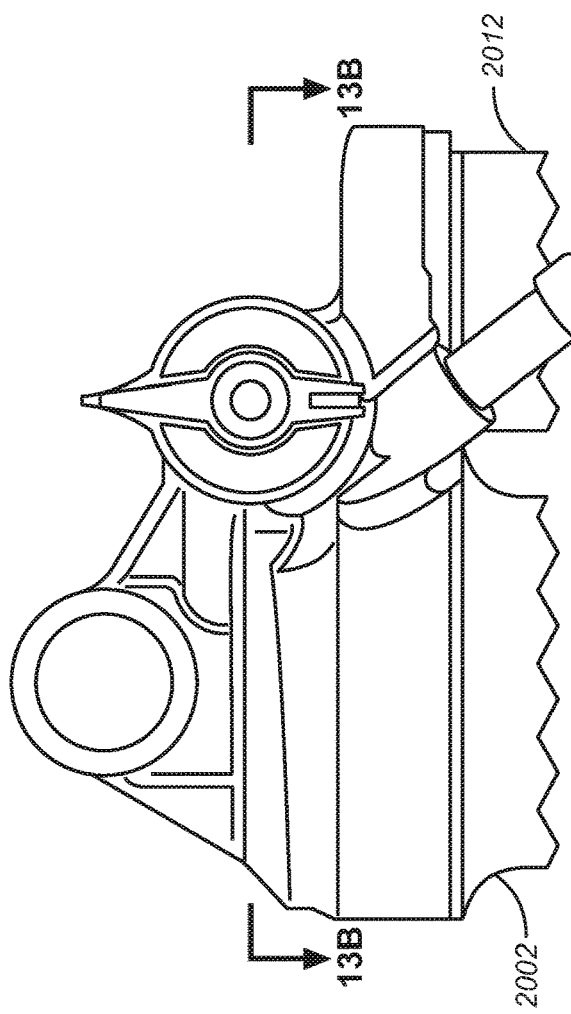
FIG. 13A is a partial front perspective view of a twin tube shock, in accordance with one embodiment of the present invention, including a section plane corresponding to the cross-sectional view provided in FIG. 13B.
Figure 13B:
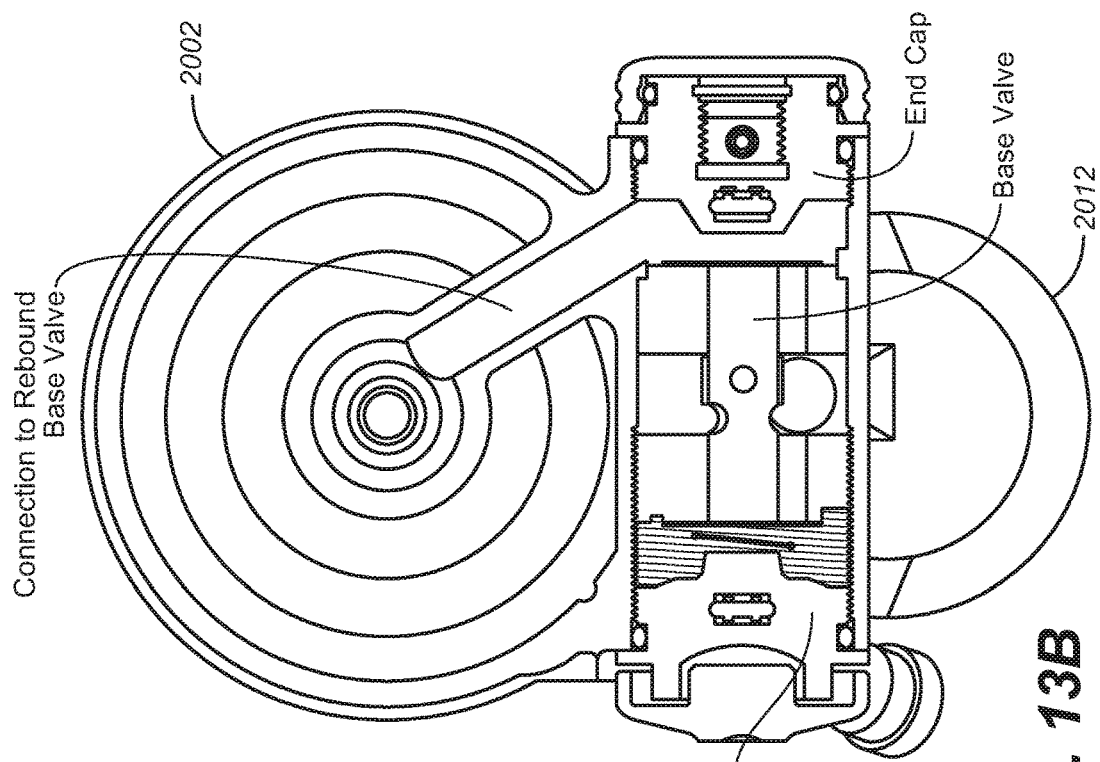
FIG. 13B is a cross-sectional view, taken through the section plane shown in FIG. 13A, showing a fluid connection path extending from the main damper body to the rebound base valve (schematically depicted as 2014 in FIG. 7), in accordance with one embodiment of the present invention.

FIG. 13A is a partial front perspective view of the present twin tube shock 2001 including a section plane corresponding to the cross-sectional view provided in FIG. 13B. FIG. 13B is a cross-sectional view taken through the section plane shown in FIG. 13A. FIG. 13B shows the fluid connection path extending from the main damper body 2002 to the rebound base valve (schematically depicted as 2014 in FIG. 7). FIG. 13B further provides a view of various components comprising an embodiment of rebound base valve 2014. Embodiments of the present invention are also well suited to having rebound base valve 2014 be comprised of any of numerous types of valve components or various configurations of such valve components.

Figure 14B:
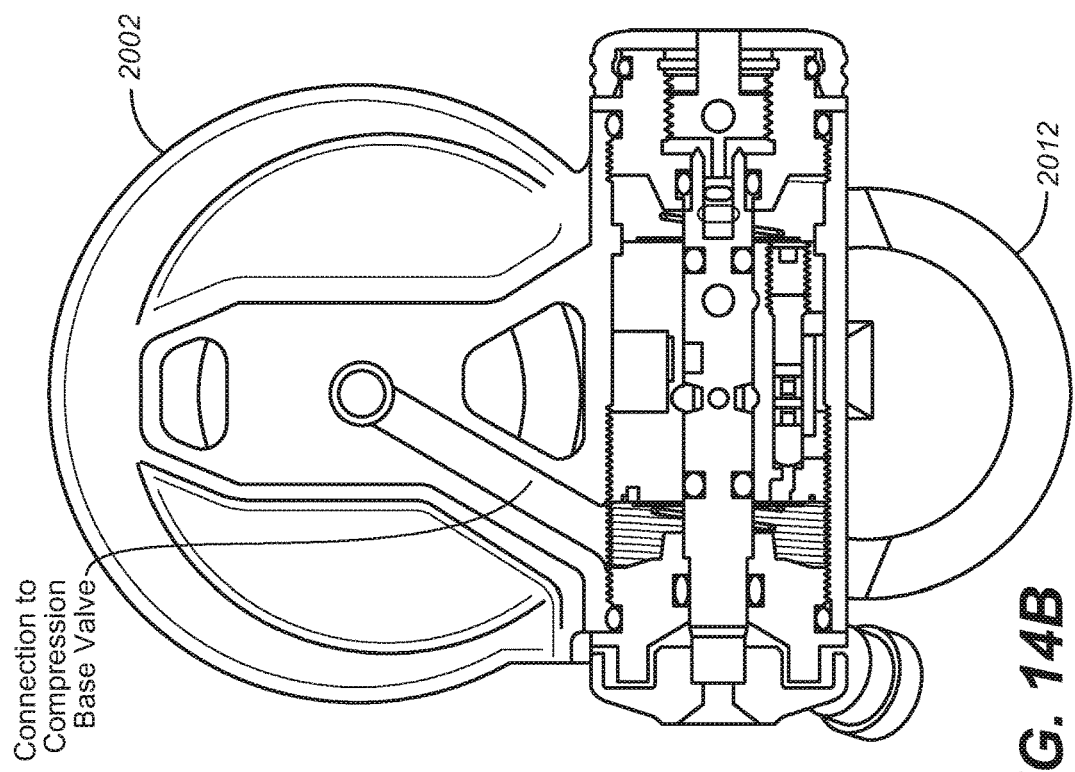
FIG. 14B is a cross-sectional view, taken through the section plane shown in FIG. 14A, showing a fluid connection path extending from the main damper body to the compression base valve (schematically depicted as 2010 in FIG. 7), in accordance with one embodiment of the present invention.
Figure 14A:
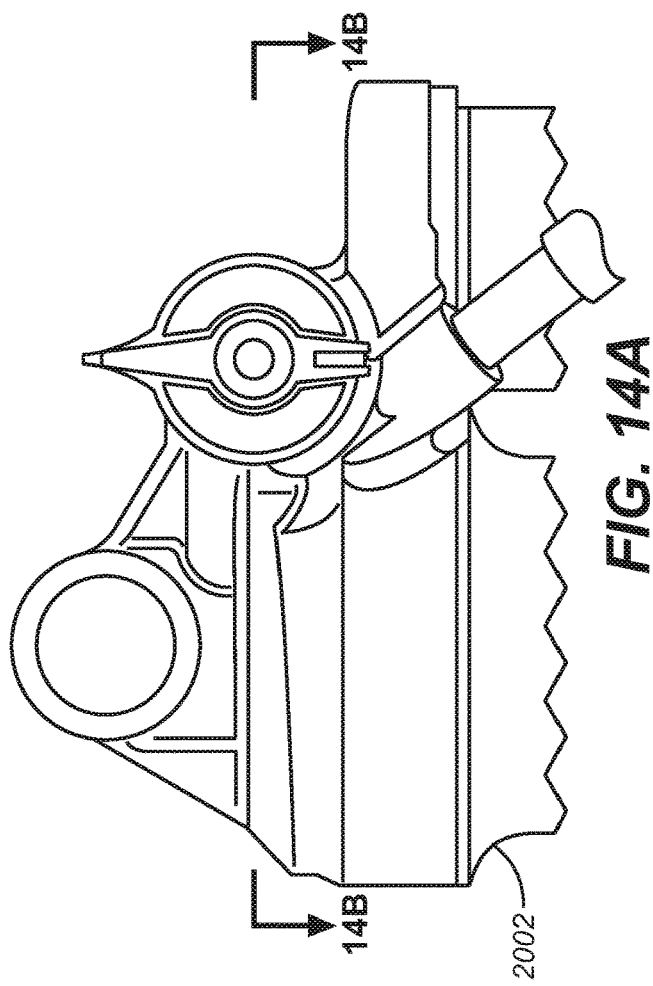
FIG. 14A is a partial front perspective view of a twin tube shock, in accordance with one embodiment of the present invention, including a section plane corresponding to the cross-sectional view provided in FIG. 14B.

FIG. 14A is a partial front perspective view of the present twin tube shock 2001 including a section plane corresponding to the cross-sectional view provided in FIG. 14B. FIG. 14B is a cross-sectional view taken through the section plane shown in FIG. 14A. FIG. 14B shows the fluid connection path extending from the main damper body 2002 to the compression base valve (schematically depicted as 2010 in FIG. 7). FIG. 14B further provides a view of various components comprising an embodiment of compression base valve 2010. Embodiments of the present invention are also well suited to having rebound base valve 2014 be comprised of any of numerous types of valve components or various configurations of such valve components.

FIG. 15 is a cross-sectional view of a base valve including a selector shaft. In one embodiment, selector shaft is coupled to, for example, externally adjustable interface 2016 of FIG. 7 to selectively control operation of the compression base valve 2010. In another embodiment, selector shaft is coupled to, for example, externally adjustable interface 2018 of FIG. 7 to selectively control operation of the rebound base valve 2014.

Figure 16:
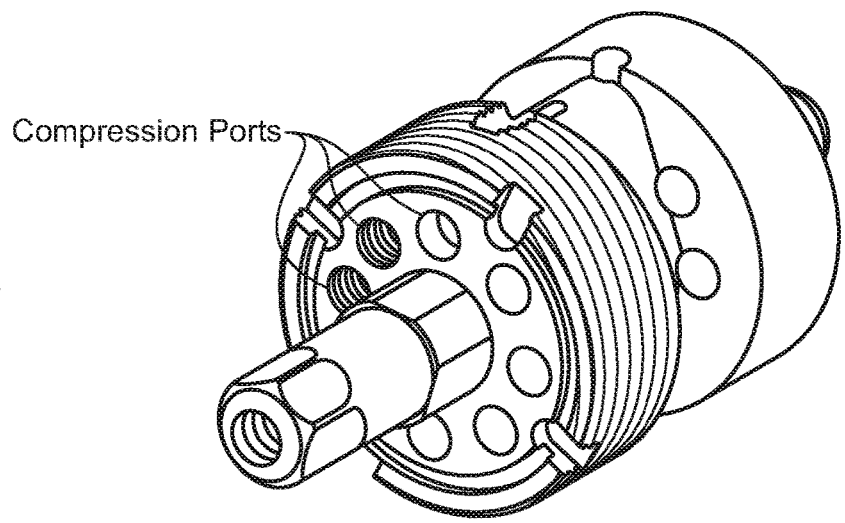
FIG. 16 is a perspective views of components comprising the base valve of FIG. 15 including compression ports, in accordance with one embodiment of the present invention.
Figure 17:
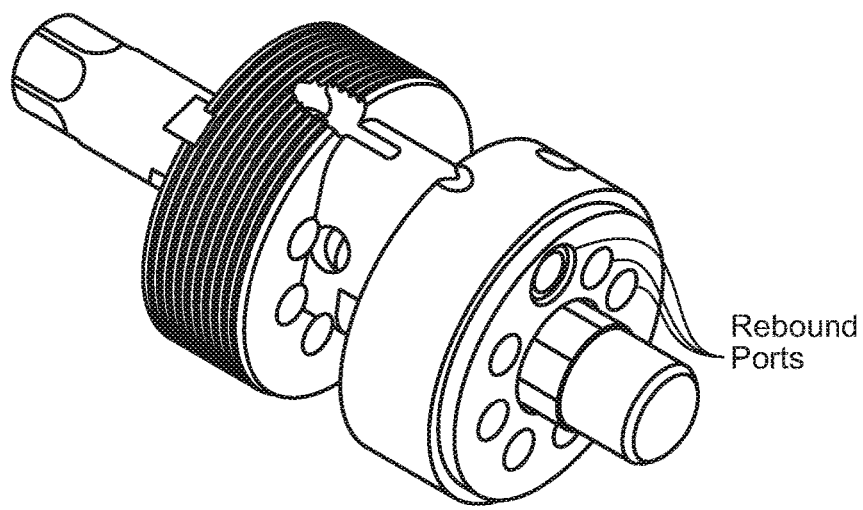
FIG. 17 is a perspective views of components comprising the base valve of FIG. 15 including rebound ports, in accordance with one embodiment of the present invention.

FIGS. 16 and 17 are perspective views of components comprising the base valve shown in FIG. 15. FIG. 16 clearly shows various compression ports in the base valve. As stated above, in embodiments of the present invention, the various ports of FIG. 16 are used to define, for example, selectable flow path 2050a and/or selectable flow path 2050b of FIG. 7 and FIG. 20. In one embodiment, a first fluidic path (e.g. selectable flow path 2050a) will include a path through a first orifice or port of the valve of FIGS. 16 and 17, while a second fluidic path (e.g. selectable flow path 2050b) will include a path through a second orifice or port of the valve of FIGS. 16 and 17. Although a particular valve type is depicted in FIG. 16, embodiments of the present invention are also well suited to use with any of numerous other types of valve components or various configurations of such valve components.

FIG. 17 also clearly shows various rebound ports in the base valve. In embodiments of the present invention, the various ports of FIG. 16 are used to define, for example, selectable flow path 2060a of FIG. 7 and FIG. 20. In one embodiment, a fluidic path (e.g. selectable flow path 2060a) will include a path through a first orifice or port of the valve of FIGS. 16 and 17, while a second fluidic path of rebound base valve 2014 will include a path through a second orifice or port of the valve of FIGS. 16 and 17. Although a particular valve type is depicted in FIG. 17, embodiments of the present invention are also well suited to use with any of numerous other types of valve components or various configurations of such valve components.

Figure 18A:
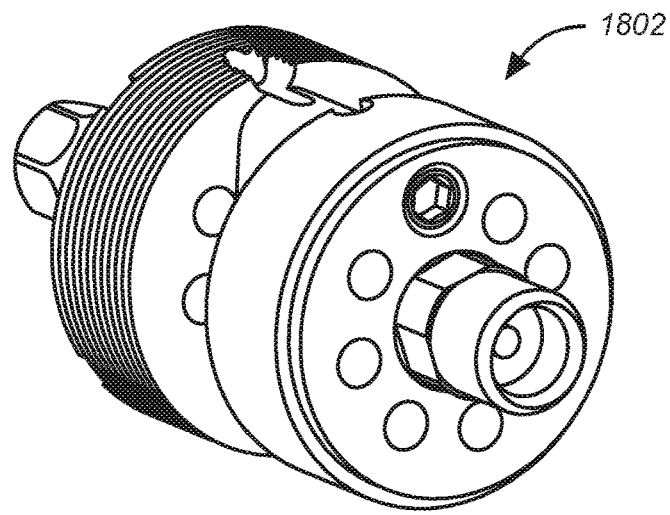
FIG. 18A is a perspective view of a base valve, in accordance with one embodiment of the present invention.
Figure 18B:
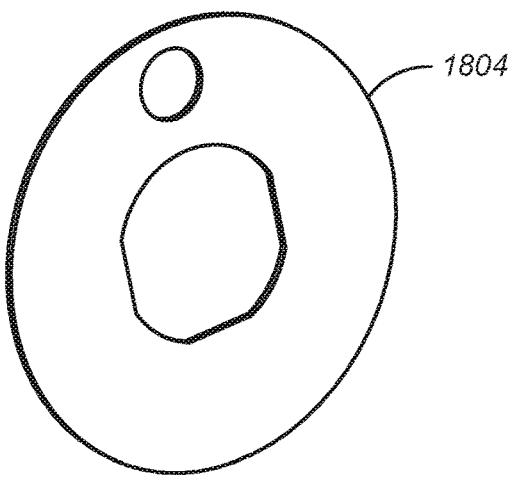
FIG. 18B is a perspective view of a selector valve for use with the base valve of FIG. 18A, in accordance with one embodiment of the present invention.
Figure 18C:
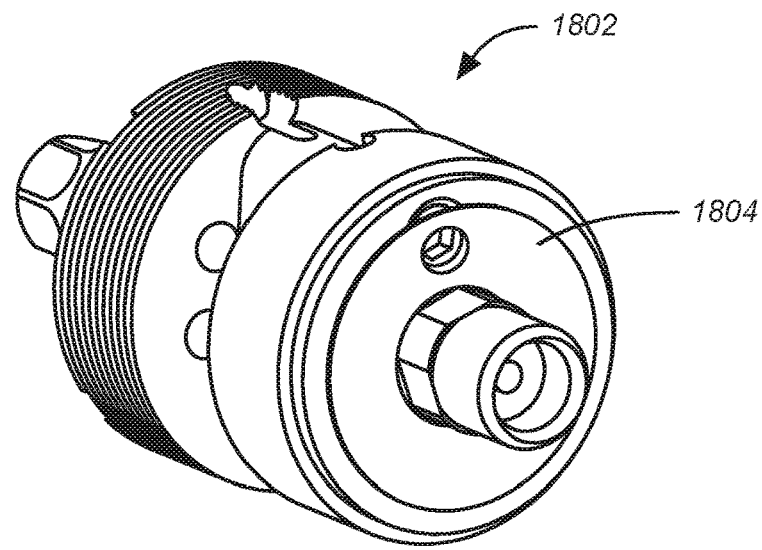
FIG. 18C is a perspective view of the base valve of FIG. 18A having the selector valve of FIG. 18B coupled thereto, in accordance with one embodiment of the present invention.

FIG. 18A is a perspective view of a base valve 1802. FIG. 18B is a perspective view of a selector valve 1804 for use with base valve 1802 of FIG. 18A. FIG. 18C is a perspective view of base valve 1802 of FIG. 18A having selector valve 1804 of FIG. 18B coupled thereto. In one embodiment of the present invention, the location and/or orientation of selector valve 1804 of 18B with respect to base valve 1802 is adjusted or set to define a particular fluidic path (e.g. selectable flow path 2050a of FIGS. 7 and 20) for compression base valve 2010. Similarly, one embodiment of the present invention, the location and/or orientation of selector valve 1804 of 18B with respect to base valve 1802 is adjusted or set to define a particular fluidic path (e.g. selectable flow path 2060a of FIGS. 7 and 20) for rebound base valve 2014.

Figure 19A:
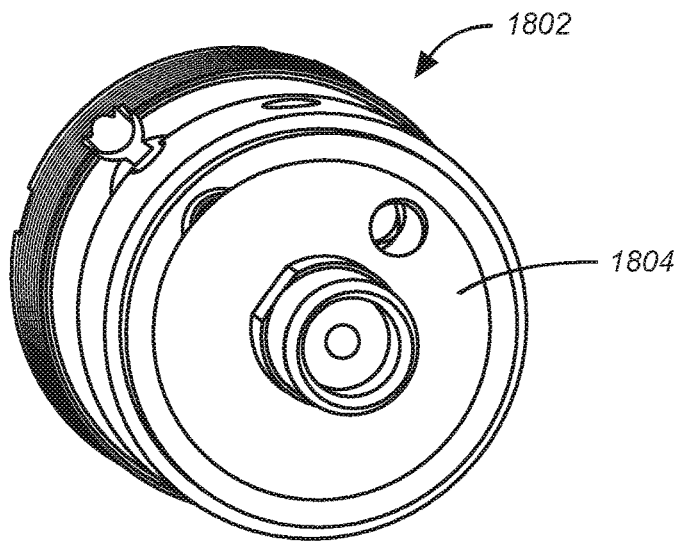
FIG. 19A is a perspective view of the base valve of FIG. 18A having the selector valve of FIG. 18B coupled thereto in a first position to selectively control the flow of fluid through the base valve, in accordance with one embodiment of the present invention.
Figure 19B:
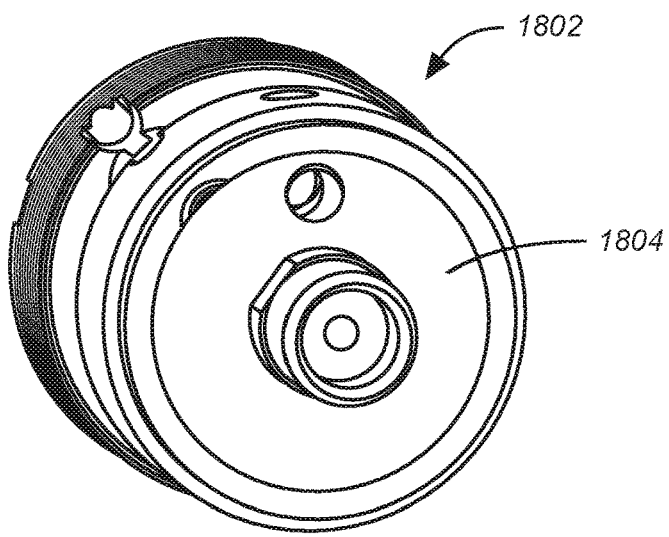
FIG. 19B is a perspective view of the base valve of FIG. 18A having the selector valve of FIG. 18B coupled thereto in a second position to selectively control the flow of fluid through the base valve, in accordance with one embodiment of the present invention.
Figure 19C:
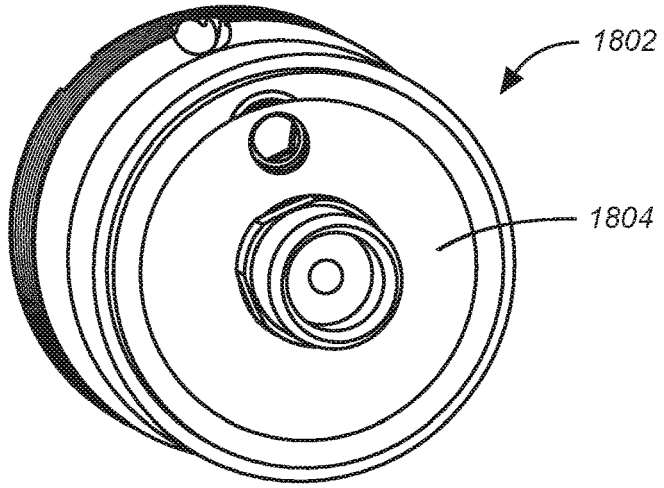
FIG. 19C is a perspective view of the base valve of FIG. 18A having the selector valve of FIG. 18B coupled thereto in a third position to selectively control the flow of fluid through the base valve, in accordance with one embodiment of the present invention.

FIGS. 19A, 19B and 19C are perspective views of base valve 1802 of FIG. 18A having selector valve 1804 of FIG. 18B oriented in various positions with respect to base valve 1802, to selectively control the flow of fluid through the combination of base valve 1802 and selector valve 1804. Again, and as stated above, in one embodiment of the present invention, the location and/or orientation of selector valve 1804 of 18B with respect to base valve 1802 (as depicted in FIGS. 19A, 19B, and 19C) is adjusted or set to define a particular fluidic path (e.g. selectable flow path 2050a or selectable flow path 2050b of FIGS. 7 and 20) for compression base valve 2010. Similarly, one embodiment of the present invention, the location and/or orientation of selector valve 1804 of 18B with respect to base valve 1802 (as depicted in FIGS. 19A, 19B, and 19C) is adjusted or set to define a particular fluidic path (e.g. selectable flow path 2060a of FIGS. 7 and 20) for rebound base valve 2014.

Referring now to FIG. 20, another embodiment of the present invention is provided. In the embodiment of FIG. 20, a controlled bypass fluid path 2020 is created which extends between compression side 2003 and rebound side 2005 (i.e. around main damping piston 2006) but which does not flow through fluid accumulator 2012. In one embodiment of the present invention, at least a third optional externally adjustable interface 2021 is used to control the controlled bypass fluid path 2020. Hence, in the embodiment of FIG. 20, a fluid pathway fluidically couples the first fluid volume (e.g., compression side 2003) and the second fluid volume (e.g., rebound side 2005) to enable fluid to flow around main damping piston 2006 but without having the fluid pass through the fluid accumulator. In one embodiment, bypass openings such as, for example, openings 110a-d of FIG. 2 are used to achieve controlled bypass fluid path 2020.

In one embodiment of the present invention, an externally adjustable interface (such as externally adjustable interface 2016) is used to adjust the location and/or orientation of selector valve 1804 of 18B with respect to base valve 1802 (as depicted in FIGS. 19A, 19B, and 19C). Thus, in such an embodiment, externally adjustable interface 2016 can be used to adjust the location and/or orientation of selector valve 1804 of 18B with respect to base valve 1802 to thereby set or define a particular fluidic path (e.g. selectable flow path 2050a or selectable flow path 2050b of FIGS. 7 and 20) for compression base valve 2010.

In one embodiment of the present invention, an externally adjustable interface (such as externally adjustable interface 2018) is used to adjust the location and/or orientation of selector valve 1804 of 18B with respect to base valve 1802 (as depicted in FIGS. 19A, 19B, and 19C). Thus, in such an embodiment, externally adjustable interface 2018 can be used to adjust the location and/or orientation of selector valve 1804 of 18B with respect to base valve 1802 to thereby set or define a particular fluidic path (e.g. selectable flow path 2060a of FIGS. 7 and 20) for rebound base valve 2014.

Referring still to FIG. 20, in embodiments of the present invention, unlike with conventional dampers, adjustments made to compression base valve 2010 via externally adjustable interface 2016, do not affect rebound base valve 2014 or controlled bypass fluid path 2020. That is, the selection of a particular selectable flow path (e.g. one of selectable flow paths 2050a and 2050b) for compression base valve 2010, does not alter the flow path of rebound base valve 2014 or affect controlled bypass fluid path 2020. Hence, in such an embodiment, compression base valve 2010 is independently adjustable and such an adjustment to compression base valve 2010 does not affect rebound base valve 2014 or controlled bypass fluid path 2020.

In another embodiment of the present invention, externally adjustable interface 2016 also controls the selection between settings for rebound base valve 2014. That is, externally adjustable interface 2016 also controls the fluidic coupling between rebound side 2005 and fluid accumulator 2012 by selectively controlling the flow of fluid through the various components of the adjustable valve (rebound base valve 2014). That is, in such an embodiment, the selection of a particular selectable flow path (e.g. one of selectable flow paths 2050a and 2050b) for compression base valve 2010, also alters the flow path of rebound base valve 2014. Hence, in such an embodiment, compression base valve 2010 is not independently adjustable and such an adjustment to compression base valve 2010 also affects rebound base valve 2014.

In still another embodiment of the present invention, externally adjustable interface 2016 also controls the selection between settings for rebound base valve 2014 and controlled bypass fluid path 2020. That is, externally adjustable interface 2016 also controls the fluidic coupling between rebound side 2005 and fluid accumulator 2012 by selectively controlling the flow of fluid through the various components of the adjustable valve (rebound base valve 2014), and also controls a fluid pathway between the first fluid volume (e.g., compression side 2003) and the second fluid volume (e.g., rebound side 2005) around main damping piston 2006 without having the fluid pass through the fluid accumulator. That is, in such an embodiment, the selection of a particular selectable flow path (e.g. one of selectable flow paths 2050a and 2050b) for compression base valve 2010, also affects the flow path of rebound base valve 2014, and affects controlled bypass fluid path 2020. Hence, in such an embodiment, compression base valve 2010 is not independently adjustable and such an adjustment to compression base valve 2010 affects rebound base valve 2014 and controlled bypass fluid path 2020.

Thus, in various embodiments of the present invention, any two or more of externally adjustable interface 2016, externally adjustable interface 2018, and externally adjustable interface 2021 may be coupled mechanically, hydraulically, pneumatically or through any other approach which will allow the any two or more of externally adjustable interface 2016, externally adjustable interface 2018, and externally adjustable interface 2021 to be operated together.

Referring again to FIG. 20, in one embodiment, externally adjustable interface 2018 controls fluidic coupling, via rebound base valve 2014, between rebound side 2005 and fluid accumulator 2012. Thus, externally adjustable interface 2018 ultimately adjusts rebound base valve 2014 (e.g., the threshold value of rebound base valve 2014, in one embodiment) and thereby controls the flow of fluid along the fluid pathway extending between the second fluid volume (rebound side 2005) and the accumulator fluid volume. In one such embodiment, the adjustment of rebound base valve 2014 does not affect compression base valve 2010 or controlled bypass fluid path 2020.

Referring still to FIG. 20, in one embodiment, externally adjustable interface 2021 controls the controlled bypass fluid path 2020. In one such embodiment, the adjustment of controlled bypass fluid path 2020 does not affect compression base valve 2010 or rebound base valve 2014.

With reference still to FIG. 20, in one embodiment, when externally adjustable interface 2016 is set at a restrictive compression base valve setting (hard mode), externally adjustable interface 2016 also prevents fluid from flowing from the rebound side 2005 to fluid accumulator 2012 through rebound base valve 2014. As a result, in such an embodiment, compression base valve 2010 controls the maximum possible threshold force (hard mode) for twin tube shock 2001. That is, in various embodiments of the present invention, the maximum possible threshold force for twin tube shock 2001 is controlled by compression base valve 2010, as selectively controlled by externally adjustable interface 2016. Hence, in an embodiment of the present invention, damping piston valving 2008 of main damping piston 2006 is chosen such that is has a non-maximum compression damping setting. In such an embodiment, damping piston valving 2008 of main damping piston 2006 does not undesirably limit the softness of the soft mode for twin tube shock 2001.

The embodiment of FIG. 20 is utilized, in one example, only when it is desired to place twin tube shock 2001 in a hard mode. In various embodiments, when twin tube shock 2001 is in hard mode, rebound base valve 2014 prevents the flow of fluid from rebound side 2005 into fluid accumulator 2012. Under such conditions, fluid is only able to flow from rebound side 2005 to compression side 2003 by flowing through damping piston valving 2008. However, in order to regulate rebound speeds during typical operation of twin tube shock 2001, damping piston valving 2008 is typically designed to prevent rapid flow of fluid from rebound side 2005 to compression side 2003. Thus, when rebound base valve 2014 prevents the flow of fluid from rebound side 2005 into fluid accumulator 2012 (e.g. in hard mode), fluid is not able to flow at the needed rate from rebound side 2005 to compression side 2003. In the present embodiment, when twin tube shock 2001 is in hard mode, controlled bypass fluid path 2020 is opened and is used to enable fluid to flow more readily from rebound side 2005 to compression side 2003. As a result, the present embodiment improves the speed of rebound even when twin tube shock 2001 is in hard mode, and regardless of the stiffness or restriction of rebound valving of main damping piston 2006.

Additionally, in various embodiments, externally adjustable interface 2016 is powered such that it is operable, for example, by a user selectable switch located remotely from the twin tube shock 2001. In one such embodiment, a power source, on the vehicle utilizing twin tube shock 2001, is used to control the operation of externally adjustable interface 2016. Additionally, in such an embodiment, externally adjustable interface 2016 may or may not remain manually adjustable as previously described. Hydraulically actuated valving for use with additional components (such as, for example, externally adjustable interface 2016) is shown and described in U.S. Pat. No. 6,073,536 and that patent is incorporated by reference herein in its entirety. A variety of means are available for remotely controlling externally adjustable interface 2016. For instance, a source of electrical power from a 12-volt battery could be used to operate a solenoid member, thereby shifting the position of externally adjustable interface 2016. The valve or solenoid operating signal can be either via a physical conductor or an RF signal (or other wireless such as Bluetooth, WiFi, ANT) from a transmitter operated by a switch to a receiver operable on the externally adjustable interface 2016 (which would derive power from the vehicle power system such as 12 volt).

A remotely operable externally adjustable interface 2016 like the one described above is particularly useful with an on/off road vehicle. These vehicles can have as much as 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely operated externally adjustable interface 2016 described herein, dampening characteristics of a shock absorber can be completely changed from a compliantly dampened "springy" arrangement to a highly dampened and "stiffer" (or fully locked out) system ideal for higher speeds on a smooth road.

In addition to, or in lieu of, the manual operation of externally adjustable interface 2016, externally adjustable interface 2016 can be operated automatically based upon one or more driving conditions. These driving conditions include, but are not limited to any or all of vehicle speed, damper rod speed, and damper rod position. One embodiment of the present invention is designed to automatically increase dampening in the twin tube shock absorber in the event a damper rod reaches a certain velocity in its travel towards the bottom end of a damper at a predetermined speed of the vehicle. In one embodiment, the system adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment the system adds dampening (e.g. changes the setting of externally adjustable interface 2016) in the event that the rod velocity in compression is relatively low, but the rod progresses past a certain point in the travel. Such configuration aids in stabilizing the vehicle against excessive low rate suspension movement events such as cornering roll, braking and acceleration yaw and pitch and "g-out."

Any other suitable vehicle operation variable may be used such as for example piston rod compression strain, eyelet strain, vehicle mounted accelerometer (or tilt/inclinometer) data or any other suitable vehicle or component performance data. In one embodiment, the position of main damping piston 2006 within twin tube shock 2001 is determined using an accelerometer to sense modal resonance of main damper body 2002. Such resonance will change depending on the position of main damping piston 2006 and an on-board processor (computer) is calibrated to correlate resonance with axial position. In one embodiment, a suitable proximity sensor or linear coil transducer or other electro-magnetic transducer is incorporated in the dampening cylinder to provide a sensor to monitor the position and/or speed of the main damping piston 2006 (and suitable magnetic tag) with respect to main damper body 2002. In one embodiment, the magnetic transducer includes a waveguide and a magnet, such as a doughnut (toroidal) magnet that is joined to main damper body 2002 and oriented such that the magnetic field generated by the magnet passes through damper shaft 2004 and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital, or analog, proportional to the calculated distance and/or velocity. A transducer-operated arrangement for measuring piston rod (or damper shaft) speed and velocity is described in U.S. Pat. No. 5,952,823 and that patent is incorporated by reference herein in its entirety.

While a transducer assembly located at the main damper body measures damper shaft/rod speed and location, a separate wheel speed transducer for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, a logic unit with user-definable settings receives inputs from the rod speed and location transducers as well as the wheel speed transducer. The logic unit is user-programmable and depending on the needs of the operator, the unit records the variables and then if certain criteria are met, the logic circuit sends its own signal to the externally adjustable interface 2016. Thereafter, the condition of the externally adjustable interface 2016 is relayed back to the logic unit.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A fluid damper comprising:
a damper housing having a first fluid volume and a second fluid volume;
a damping piston reciprocatingly disposed within said damper housing separating said first fluid volume from said second fluid volume, said damping piston having damping piston valving coupled thereto;
a piston fluid pathway through said damping piston and said damping piston valving, said piston fluid pathway permitting fluid communication between said first fluid volume and said second fluid volume when a pressure in one of said first fluid volume and the second fluid volume exceeds a threshold value of said damping piston valving;
a fluid accumulator having a pressurizable gas volume and an accumulator fluid volume isolated from one another by a separation member;
a first fluid pathway extending solely between said first fluid volume and said accumulator fluid volume;
a second fluid pathway extending solely between said second fluid volume and said accumulator fluid volume;
a third fluid pathway fluidically coupling said first fluid volume and said second fluid volume to enable fluid flow around said damping piston without passing through said fluid accumulator and without flowing through said piston fluid pathway through said damping piston and said damping piston valving, said third fluid pathway extending between said first fluid volume and said second fluid volume but which does not extend through said fluid accumulator, said third fluid pathway comprising:
an internal bypass fluid path formed within said damper housing; and
internal bypass openings formed in an interior surface of said damper housing, said internal bypass openings fluidly coupled with said internal bypass fluid path;
a first adjustable valve, said first adjustable valve disposed in said first fluid pathway said first adjustable valve having a selectable threshold value which exceeds said threshold value of said damping piston valving, said first adjustable valve including a pressure relief valve, said pressure relief valve of said first adjustable valve disposed to automatically allow fluid flow from said first fluid volume into said accumulator fluid volume when a pressure within said first fluid volume exceeds a first pressure relief valve threshold value, said pressure relief valve of said first adjustable valve for preventing hydrolock of said fluid damper;
a first externally adjustable interface coupled to said first adjustable valve, said first externally adjustable interface configured to enable a user to select between at least two settings for said first adjustable valve;
a second adjustable valve, said second adjustable valve disposed in said second fluid pathway, said second adjustable valve including a pressure relief valve, said pressure relief valve of said second adjustable valve disposed to automatically allow fluid flow from said second fluid volume into said accumulator fluid volume when a pressure within said second fluid volume exceeds a second pressure relief valve threshold value, said pressure relief valve of said second adjustable valve for preventing hydrolock of said fluid damper, such that said fluid damper has two pressure relief valves, said pressure relief valve of said first adjustable valve and said pressure relief valve of said second adjustable valve, for said preventing hydrolock of said fluid damper;

a second externally adjustable interface coupled to said second adjustable valve, said second externally adjustable interface configured to enable said user to select between at least two settings for said second adjustable valve;

wherein adjustments made to said first adjustable valve, via said first externally adjustable interface, do not affect said second fluid pathway through said second adjustable valve;

wherein adjustments made to said second adjustable valve, via said second externally adjustable interface, do not affect said first fluid pathway through said first adjustable valve such that said first adjustable valve and said second adjustable valve are independently adjustable, such that an adjustment to a compression damping characteristic of said fluid damper can be made without affecting a rebound damping characteristic of said fluid damper, and such that an adjustment to said rebound damping characteristic of said fluid damper can be made without affecting said compression damping characteristic of said fluid damper; and wherein said first externally adjustable interface is operated automatically based upon at least one driving condition of a vehicle to which said damper is coupled, wherein said damping piston valving of said damping piston has a non-maximum compression damping setting, and wherein said damping piston valving of said damping piston does not limit a softness of a soft mode for said fluid damper.

2. The fluid damper of claim 1 wherein said first fluid volume is a compression chamber of said damper housing and said second fluid volume is a rebound chamber of said damper housing.

3. The fluid damper of claim 1 wherein said first externally adjustable interface is powered.

4. The fluid damper of claim 1 wherein said first externally adjustable interface is operable by said user located remotely from said damper.

5. The fluid damper of claim 1 wherein said second externally adjustable interface is powered.

6. The fluid damper of claim 1 wherein said second externally adjustable interface is operable by said user located remotely from said damper.

7. The fluid damper of claim 1 wherein said second externally adjustable interface is operated automatically based upon at least one driving condition of a vehicle to which said damper is coupled.

* * * * *